United States Patent
Grossman et al.

(10) Patent No.: US 10,387,175 B2
(45) Date of Patent: Aug. 20, 2019

(54) METHOD AND SYSTEM FOR PROVIDING SOFTWARE APPLICATION END-USERS WITH CONTEXTUAL ACCESS TO TEXT AND VIDEO INSTRUCTIONAL INFORMATION

(75) Inventors: Tovi Grossman, Toronto (CA); George Fitzmaurice, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 710 days.

(21) Appl. No.: 12/849,706

(22) Filed: Aug. 3, 2010

(65) Prior Publication Data

US 2011/0099474 A1 Apr. 28, 2011

Related U.S. Application Data

(60) Provisional application No. 61/254,571, filed on Oct. 23, 2009.

(51) Int. Cl.
*G06F 3/0482* (2013.01)
*G06F 3/0483* (2013.01)
*G06F 9/451* (2018.01)

(52) U.S. Cl.
CPC .................. *G06F 9/453* (2018.02)

(58) Field of Classification Search
CPC .... G06F 3/0482; G06F 3/0481; G06F 3/0483; G06F 3/04817; G06F 9/4446; G06F 3/04895; H04N 5/44543; G06Q 10/10; G09B 19/0053
USPC ........................................ 715/810, 764, 709
See application file for complete search history.

(56) References Cited

U.S. PATENT DOCUMENTS

| | | | | |
|---|---|---|---|---|
| 6,020,886 A * | 2/2000 | Jacober et al. | ............... | 715/709 |
| 6,437,800 B1 * | 8/2002 | Malamud et al. | ............ | 715/711 |
| 7,237,240 B1 * | 6/2007 | Chen et al. | .................... | 718/100 |
| 7,346,846 B2 * | 3/2008 | Rossi et al. | .................... | 715/705 |
| 7,836,050 B2 * | 11/2010 | Jing et al. | ..................... | 707/728 |
| 7,865,829 B1 * | 1/2011 | Goldfield et al. | ............ | 715/708 |
| 7,956,869 B1 * | 6/2011 | Gilra | ............................. | 345/592 |
| 7,970,263 B1 * | 6/2011 | Asch | ............................. | 386/350 |
| 8,151,192 B2 * | 4/2012 | Black et al. | .................. | 715/708 |
| 8,151,193 B2 * | 4/2012 | Hernacki et al. | ............. | 715/709 |
| 2003/0058267 A1 * | 3/2003 | Warren | ............ | G06F 17/30716 715/705 |
| 2003/0063126 A1 * | 4/2003 | Yanchar et al. | .............. | 345/781 |

(Continued)

OTHER PUBLICATIONS

Abowd, G. D., et al. (1996). Teaching and learning as multimedia authoring: the classroom 2000 project. ACMMultimedia. pp. 187-198.

(Continued)

*Primary Examiner* — Kevin L Young
*Assistant Examiner* — Erik V Stitt
(74) *Attorney, Agent, or Firm* — Artegis Law Group, LLP

(57) ABSTRACT

A tool data engine displays instructional information to an end-user of a software application that pertains to one or more tools associated with the software application. The tool data engine displays the instructional information within a graphical user interface (GUI) after the user has indicated interest in that tool. The instructional information includes a detailed description of the tool and one or more video clips associated with the tool. The tool data engine also allows end-users to record and/or upload video clips that demonstrate usage of the tool.

20 Claims, 18 Drawing Sheets

(56) References Cited

U.S. PATENT DOCUMENTS

| | | | |
|---|---|---|---|
| 2004/0179017 A1* | 9/2004 | Martyn et al. | 345/536 |
| 2009/0024624 A1* | 1/2009 | Drew | G06F 17/30961 |
| 2009/0187429 A1* | 7/2009 | Scalet | G06Q 40/08 705/4 |
| 2010/0131452 A1* | 5/2010 | Fitzmaurice et al. | 706/54 |

OTHER PUBLICATIONS

Ames, A. L. (2001). Just what they need, just when they need it: an introduction to embedded assistance. ACM SIGDOC. pp. 111-115.

Anderson, J. R., et al. 1. (1984). Cognitive principles in the design of computer tutors. TR ONR-84-I. Carnegie-Mellon University.

Baecker, R. (2002). Showing instead of telling. ACM SIGDOC. pp. 10-16.

Baecker, R., et al. (1991). Bringing icons to life. ACMCHI pp. 1-6.

Ehret, B. D. (2002). Learning where to look: location learning in graphical user interfaces. ACMCHI pp. 211-218.

Farkas, D. K. (1993). The role of balloon help. Journal of Computer Documentation. pp. 17(2):3-19.

Goodall, S. D. (1992). Online help: a part of documentation. Systems Documentation. pp. 169-174.

Grossman, T., et al. (2009). A Survey of Software Learnability: Metrics, Methodologies and Guidelines. ACMCHI. 10 pages.

Harrison, S. M. (1995). A comparison of still, animated, or nonillustrated on-line help with written or spoken instructions in a graphical user interface. ACMCHI pp. 82-89.

Hsi, I., et al. (2000). Studying the Evolution and Enhancement of Software Features. International conference on Software Maintenance. pp. 143-151.

Jackson, S. (2001). Editing computer hardware procedures for multimedia presentation. ACMSIGDOC. pp. 68-72.

Kelleher, C., et al. (2005). Stencils-based tutorials: design and evaluation. ACMCHI pp. 541-550.

Knabe, K. (1995). Apple guide: a case study in useraided design of online help. ACMCHI pp. 286-287.

Liu, T.-Y., et al. (2001). A novel algorithm for real-time full screen capture system. Multimedia Signal Processing. pp. 395-400.

Mack, R. L., et al. (1983). Learning to use word processors: problems and prospects. ACMTrans. on Irif. Systems. pp. 1(3):254-271.

McGrenere, J., et al. (2000). Are We All in the Same "Bloat"? Graphics Interface. pp. 187-196.

Minneman, S., et al. (1995). A confederation of tools for capturing and accessing collaborative activity. ACMMultimedia. pp. 523-534.

Palmiter, S., et al. (1991). An evaluation of animated demonstrations of learning computer-based tasks. ACMCHI pp. 257-263.

Palmiter, S., et al. (1991). Animated demonstrations vs. written instructions for learning procedural tasks: a preliminary investigation. Int. J of Man-Machine Studies. 34(5): pp. 687-701.

Plaisant, C., et al. (2005). Show Me! Guidelines for Producing Recorded Demonstrations. Visual Languages and Human-Centric Comp. pp. 171-178.

Shneiderman, B. (1983). Direct Manipulation: A Step Beyond Programming Languages. Computer. 16(8): pp. 57-69.

Sukaviriya, P. (1988). Dynamic construction of animated help from application context. ACMUIST pp. 190-202.

Sukaviriya, P., et al. (1992). Multimedia help: a prototype and an experiment ACMCHI pp. 433-434.

Tuck, R., et al. (1990). Help by guided tasks: utilizing UIMS knowledge. ACMCHI pp. 71-78.

Zeleznik, R. c., et al. (2008). Lineogrammer: creating diagrams by drawing. ACMUIST pp. 161-170.

Carroll, J. M., et al. (1987). Paradox of the active user. Interfacing thought: cognitive aspects of human-computer interaction. MIT Press. pp. 80-111.

Sellen, A., et al. (1995). Building user-centered on-line help. Human-computer interaction: toward the year 2000. Morgan Kaufmann Publishers. pp. 718-723.

Spannagel, C., et al. (2008). Animated demonstrations and training wheels interfaces in a complex learning environment. Interacting with Computers. 20(1): pp. 97-111.

\* cited by examiner

|  | VIDEO CLIP 1 | VIDEO CLIP 2 | VIDEO CLIP 3 |
|---|---|---|---|
| VIDEO CLIP 1 | 0 | .3 | .2 |
| VIDEO CLIP 2 | .5 | 0 | .4 |
| VIDEO CLIP 3 | .15 | .6 | 0 |

RELEVENCE TABLE 308

CELL 404

CELL 402

FIG. 4

METHOD AND SYSTEM FOR PROVIDING SOFTWARE APPLICATION END-USERS WITH CONTEXTUAL ACCESS TO TEXT AND VIDEO INSTRUCTIONAL INFORMATION

CROSS-REFERENCE TO RELATED APPLICATIONS

This application claims benefit of U.S. provisional patent application Ser. No. 61/254,571, filed on Oct. 23, 2009, which is hereby incorporated herein by reference.

BACKGROUND OF THE INVENTION

Field of the Invention

The present invention generally relates to software usage and, more specifically, to a method and system for providing instructional information to software application end-users.

Description of the Related Art

A wide variety of software applications are currently available to end-users, including computer-aided design (CAD) applications, computer graphics applications, animation applications, word processing applications, and computer programming applications, among others. Many of these software applications allow an end-user to interact with the software application via a graphical end-user interface (GUI). Conventional GUIs often provide the end-user with access to a set of tools that can be used to perform various operations within a workspace generated by the software application. For example, a CAD application could provide a set of drawing tools that could be used to draw different shapes within a drawing workspace generated by the CAD application. Each tool in the set of tools could be represented within the GUI with an icon that the end-user could select in order to use the tool.

Software applications such as the CAD application described above may also provide the end-user with instructional information that assists the end-user with using the different tools associated with the software application. For example, the software application may include a "help" database that receives a query from the end-user and then identifies articles that relate to the received query. Those articles may then be displayed to the end-user. One problem with conventional help databases is that the end-user is required to open a new window in order to submit a query to the help database. When the end-user is actively working within a workspace generated by the software application and needs to access instructional information pertaining to that work, the end-user is required to stop working in order to access the help database. Such interruptions may inhibit the productivity of the end-user.

One solution to this problem is to superimpose instructional information over the end-user's workspace via a "pop-up" text box when the end-user performs certain actions. For example, when the end-user positions a cursor over the icon associated with a particular tool, the software application could display a brief description of that tool within a pop-up text box. This approach allows the end-user to access instructional information more quickly and without navigating away from their workspace. However, this approach suffers from certain drawbacks.

First, the brief description provided within each pop-up text box is typically too short to adequately convey to the end-user how the tool is used. In fact, most pop-up text boxes only describe to the end-user what the tool does, and so the end-user may still have difficulty learning to use the tool. Second, conventional pop-up text boxes disappear when the end-user relocates the cursor, thereby preventing the end-user from performing any operations without causing the pop-up text box to disappear. Third, the instructional information for each tool is limited to the brief description initially associated with the tool and cannot be expanded to include new information. Consequently, in situations where the pop-up text box does not provide the end-user with sufficient information to be able to use a particular tool, the end-user may never learn how to effectively use that tool.

As the foregoing illustrates, there is a need in the art for a more effective way to provide end-users of a software application with information related to usage of the software application.

SUMMARY OF THE INVENTION

One embodiment of the present invention sets forth a computer-implemented method for providing instructional information to an end-user of a software application. The method includes the steps of receiving from the end-user an indication of a tool that is associated with the software application and is configured to allow data associated with the software application to be modified, causing a display device to display a tool data graphical user interface (GUI) in response to the indication, where the tool data GUI includes a first portion of instructional information pertaining to usage of the tool and one or more GUI elements, receiving from the end-user a selection of a first GUI element included in the tool data GUI, and updating the tool data GUI to display a second portion of instructional information pertaining to usage of the tool in response to the selection.

One advantage of the disclosed method is that it enables instructional information associated with a particular software tool to be displayed while the end-user performs other tasks with a cursor. The instructional information is sufficiently detailed to allow the end-user to learn how to use the particular tool as well as tools associated with a software application.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 4 is a conceptual diagram that illustrates a similarity table, according to one embodiment of the invention;

DETAILED DESCRIPTION

Figure 1A:
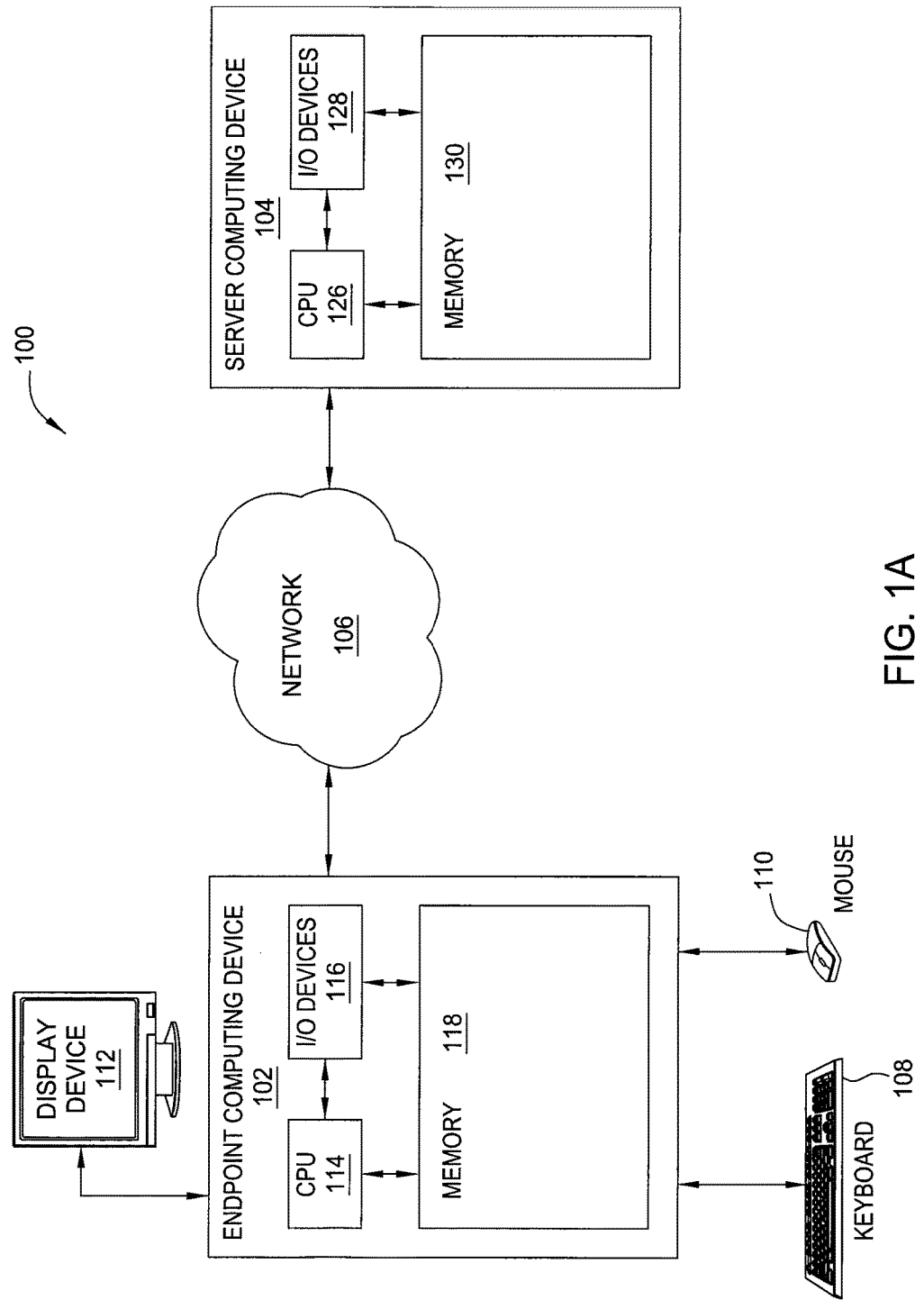
FIG. 1A illustrates a computer system configured to implement one or more aspects of the present invention.

FIG. 1A illustrates a computer system 100 configured to implement one or more aspects of the present invention. As shown, the computer system 100 includes an endpoint computing device coupled to a server computing device 104 via a network 106. The network 106 may be any technically feasible type of network that allows data to be exchanged between the endpoint computing device 102 and the server computing device 104, including a wide area network (WAN), a local area network (LAN), a wireless (WiFI) network, or the Internet, among others. In one embodiment, the endpoint computing device 102 is not coupled to the server computing device 104 and is configured to perform the functionality associated with the present invention independently. In another embodiment, the server computing device 104 is embedded within the endpoint computing device 102.

The endpoint computing device 102 may be a desktop computer, a laptop computer, a cell phone, a personal digital assistant (PDA), or any other type of computing device configured to receive input, process data, and display images. The endpoint computing device 102 receives input from an end-user via the keyboard 108 and the mouse 110 and displays graphical images to the end-user via the display device 112. The endpoint computing device 102 includes a central processing unit 114, one or more input/output devices 116, and a memory 118.

The CPU 114 may be implemented as a graphics processing unit (GPU), an application-specific integrated circuit (ASIC), a field programmable gate array (FPGA), or another type of processing unit. The CPU 114 is configured to execute program instructions associated with a particular instruction set architecture (ISA) specific to the CPU 114. The CPU 114 is also configured to receive data from and transmit data to the I/O devices 116 and the memory 118.

The I/O devices 116 include devices that may be used to input data to the endpoint computing device 102 or devices that output data from the endpoint computing device 102. The I/O devices 116 may include input devices, such as a joystick, a switch, a microphone, a video camera, or a touchpad, among others, as well as output devices, such as a speaker, a projector, or a lamp, among others. In addition, the I/O devices 116 may include devices used to input or output data to or from, respectively, the endpoint computing device 102, such as an Ethernet port, a serial port, a compact disc (CD) drive, or a digital video disc (DVD) drive, among others. The I/O devices 116 are configured to couple the endpoint computing device 102 to the server computing device 104 via the network 106. In one embodiment, the I/O devices 116 include the keyboard 108, the mouse 110, and the display device 112. The I/O devices 116 may be used to transmit data to and receive data from the CPU 114 and may also write data to and read data from the memory 118.

The memory 118 may be a hard disk, a flash memory stick, a compact disc read-only memory (CD-ROM), a random access memory (RAM) module, or any other type of volatile or non-volatile memory unit capable of storing data. The memory 118 includes various software programs that can be executed by the CPU 114, as described in greater detail below in conjunction with FIG. 1B. The software programs included in the memory 118 are configured to receive information from and transmit information to the server computing device 104 via the network 106.

The server computing device 104 may be a desktop computer, a laptop computer, a cell phone, a personal digital assistant (PDA), or any other type of computing device. The server computing device 104 includes a CPU 126, I/O devices 128, and a memory 130. The CPU 126 may be implemented as a GPU, and ASIC, an FPGA, or another type of processing unit. The CPU 126 is configured to execute program instructions associated with a particular ISA specific to the CPU 126. The CPU 126 is also configured to receive data from and transmit data to the I/O devices 128 and the memory 130.

The I/O devices 128 may include some or all of the same I/O devices as those included in the I/O devices 116. The I/O devices 114 are configured to couple the server computing device 104 to the endpoint computing device 102 via the network 106. The I/O devices 128 may be used to transmit data to and receive data from the CPU 126 and may also write data to and read data from the memory 130

The memory 130 may be a hard disk, a flash memory stick, a CD-ROM, a RAM module, or any other type of volatile or non-volatile memory unit capable of storing data. The memory 130 includes various software programs that can be executed by the CPU 126, as described in greater detail below in conjunction with FIG. 1B. The software programs included in the memory 130 are configured to transmit information to and receive information from the endpoint computing device 102 via the network 106.

Figure 1B:
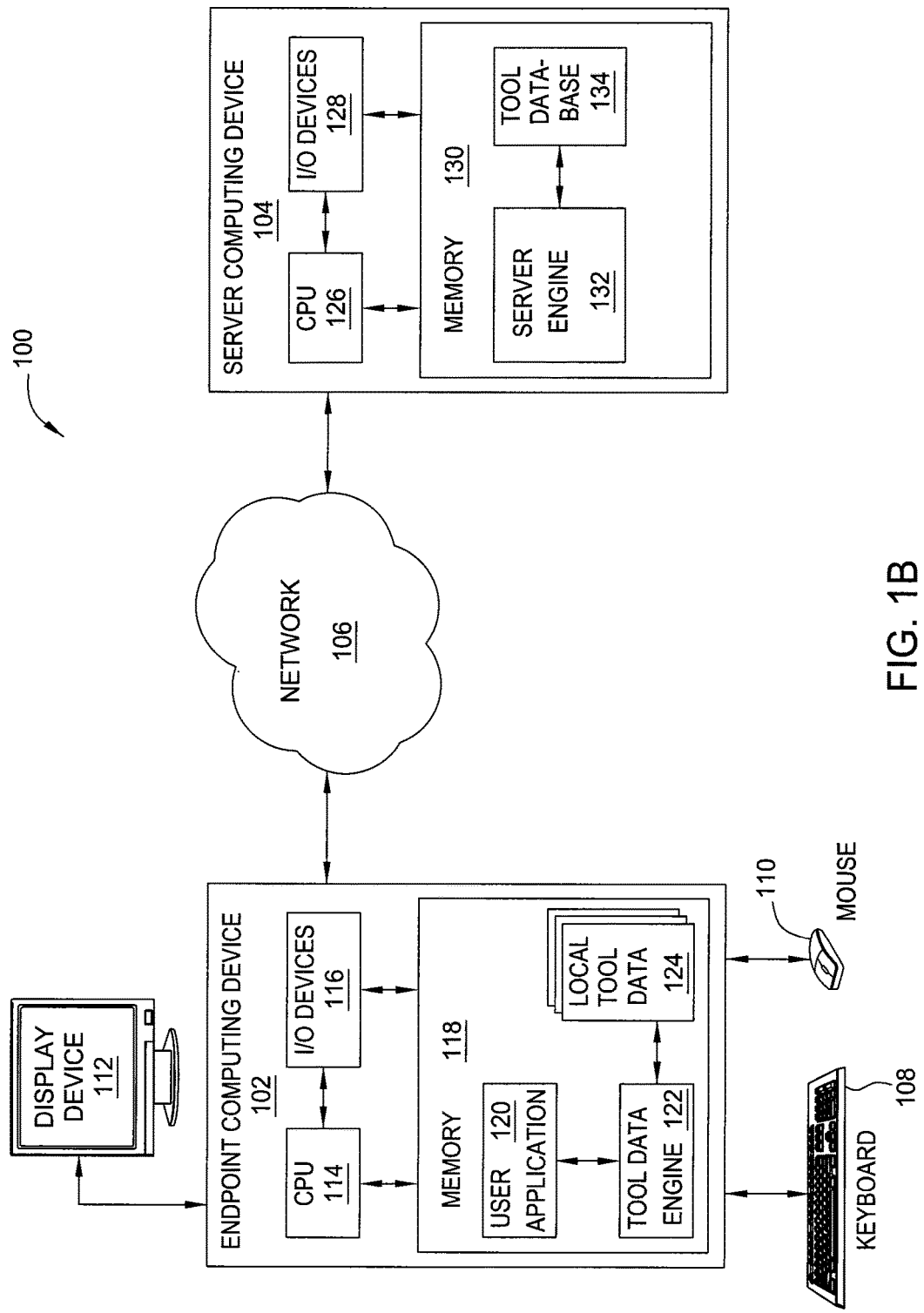
FIG. 1B illustrates the computer system of FIG. 1A in greater detail, according to one embodiment of the invention.

As also described in conjunction with FIG. 1B, the software programs included in the memory 118 of the endpoint computing device 102 and the software programs included in the memory 130 are configured to exchange data via the network 106.

FIG. 1B illustrates the computer system of FIG. 1A in greater detail, according to one embodiment of the invention. As shown, FIG. 1B illustrates the same components as those shown in FIG. 1A. In addition, FIG. 1B also illustrates a user application 120, a tool data engine 122, and local tool data 124 included within the memory 118 of the endpoint computing device 102.

The software application 120 may be a computer-aided design (CAD) application, a computer graphics application, an animation application, a word processing application, or a computer programming application, among others. The software application 120 comprises program instructions than can be executed by the CPU 114. The software application 120 is configured to receive data from an end-user of the endpoint computing device 102 via the keyboard 108 and the mouse 110 and to display graphical images to the end-user via the display device 112.

The software application 120 is configured to generate a graphical user interface (GUI) and to display the GUI to the end-user via the display device 112, as described in greater detail below in conjunction with FIGS. 5A-5H. The GUI generated by the user application 120 is referred to herein as an "application GUI." The application GUI provides the end-user with access to various tools that allows the user to manipulate data, such as graphical data or textual data, among other types of data. For example, when the software application is a CAD application, the application GUI could generate a drafting area and provide the end-user with access to various drawing tools that could each be used to draw a particular shape, such as a circle or a hexagon, within the drafting area. Each tool may be represented by a graphical icon within the application GUI. Those skilled in the art will recognize that each tool may be included within the software application 120, or, alternatively, may be a stand-alone application that operates in conjunction with the software application 120. For example, a given tool may be a plug-in, an add-on, or an in-scene widget configured to be embedded within the software application 120 and to cooperate with the software application 120. The user application 120 is configured to interact with the tool data engine 122.

The tool data engine 122 is a software program comprising program instructions that can be executed by the CPU 114. The tool data engine 122 is configured to operate in conjunction with the user application 120 to provide instructional information to the user of the software application 120 that illustrates usage of the different tools associated with the user application 120. When the end-user of the software application 120 selects a particular tool within the application GUI (e.g. by positioning a cursor over the icon that represents the tool), the tool data engine 122 displays instructional information associated with that tool to the end-user. Those skilled in the art will recognize that a given tool may be selected using any other conventional selection technique, such as, for example, by pressing a hot key or pressing the tab key to cycle through a list of tools.

The instructional information corresponding to a given tool may describe the function of the tool, provide suggestions regarding techniques for using the tool, or demonstrate the use of the tool via one or more video clips. Thus, the instructional information associated with the tool may assist the end-user when learning to use that tool. In one embodiment, the instructional information may be associated with application data associated with the software application 120. The end-user may access that instructional information by selecting a portion of the application data. For example, the end-user could select a particular region of a drawing in order to access instructional information related to that region of the drawing. The instructional information may include a list of tools used to modify that region of the drawing. The instructional information may be stored in the local tool data 124 or within the server computing device 104, as described in greater detail below in conjunction with FIG. 2.

Figure 2:
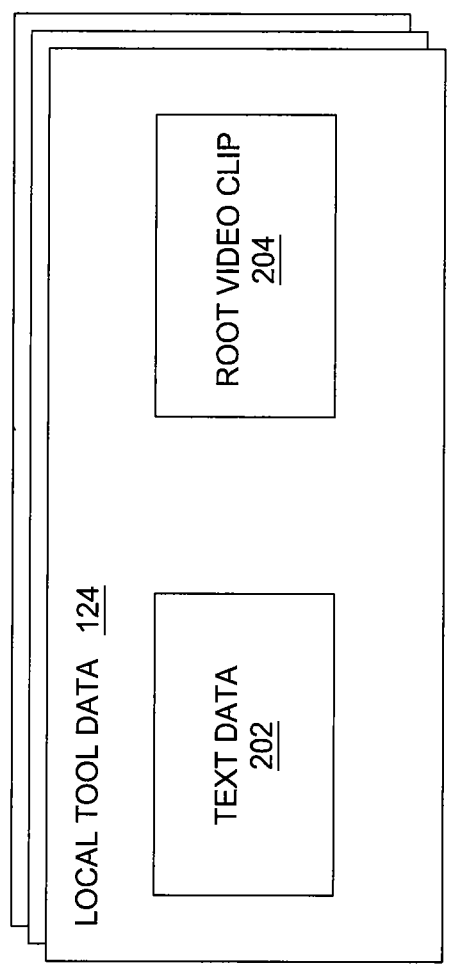
FIG. 2 is a conceptual diagram that illustrates local tool data, according to one embodiment of the invention.

FIG. 2 is a conceptual diagram that illustrates local tool data 124, according to one embodiment of the invention. As shown, the local tool data 124 includes text data 202 and a root video clip 204. The instructional information referred to above includes the text data 202 and the root video clip 204. The text data 202 includes both a brief description of the tool and a detailed description of the tool, while the root video clip 204 is a video clip demonstrating usage of the tool.

Referring back now to FIG. 1B, when the end-user selects a particular tool, (e.g., by positioning the cursor over the icon associated with the tool), the tool data engine 122 accesses the text data 202 within the local tool data 124 and displays the brief description of the tool within a "tool data GUI." The tool data GUI may also display images and/or video associated with the tool when the tool is selected by the end-user. The tool data GUI is a dialog box that displays text information, images, or video clips to the end-user. The tool data engine 122 superimposes the tool data GUI over the application GUI. In one embodiment, the tool data GUI has an alpha value that is based on the position of the cursor within the application GUI. The tool data GUI includes different action buttons that allow the end-user to access different instructional information for a particular tool, as described in greater detail below in conjunction with FIGS. 5A-5H. The tool data engine 122 is configured to retrieve additional instructional information associated with the tool by requesting the additional information from a server engine 132 within the computing device 104. In another embodiment, the end-user causes the cursor to dwell over the icon, or uses a predetermined hotkey, to access the additional instructional information.

The server engine 132 resides within the memory 130 of the server computing device 104, as shown in FIG. 1B. The server engine 132 is a software program comprising program instructions that can be executed by the CPU 126. In response to the tool data engine 122 requesting the additional instruction information, the server engine 132 accesses a tool database 134. The tool database 134 also resides within the memory 130 of the server computing device 104. The server engine 132 then retrieves from the tool database 134 additional video clips that are related to, or relevant to, the root video clip 204 for the tool. Such video clips could, for example, provide a more detailed explanation of a concept mentioned only briefly in the root video clip 204. Thus, those video clips would be considered "relevant" to the root video clip 204. In one embodiment, the endpoint machine 102 stores a subset of the video clips included within the tool database 134 so that multiple video clips are accessible to the end-user in situations where the endpoint machine 102 is not in data communication with the server machine 104 (e.g., due to a network failure). The server engine 132 may also retrieve video clips relevant to any video clip displayed within the tool data GUI, in addition to video clips related to the root video clip 204. The tool database is described in greater detail below in FIG. 3.

Figure 3:
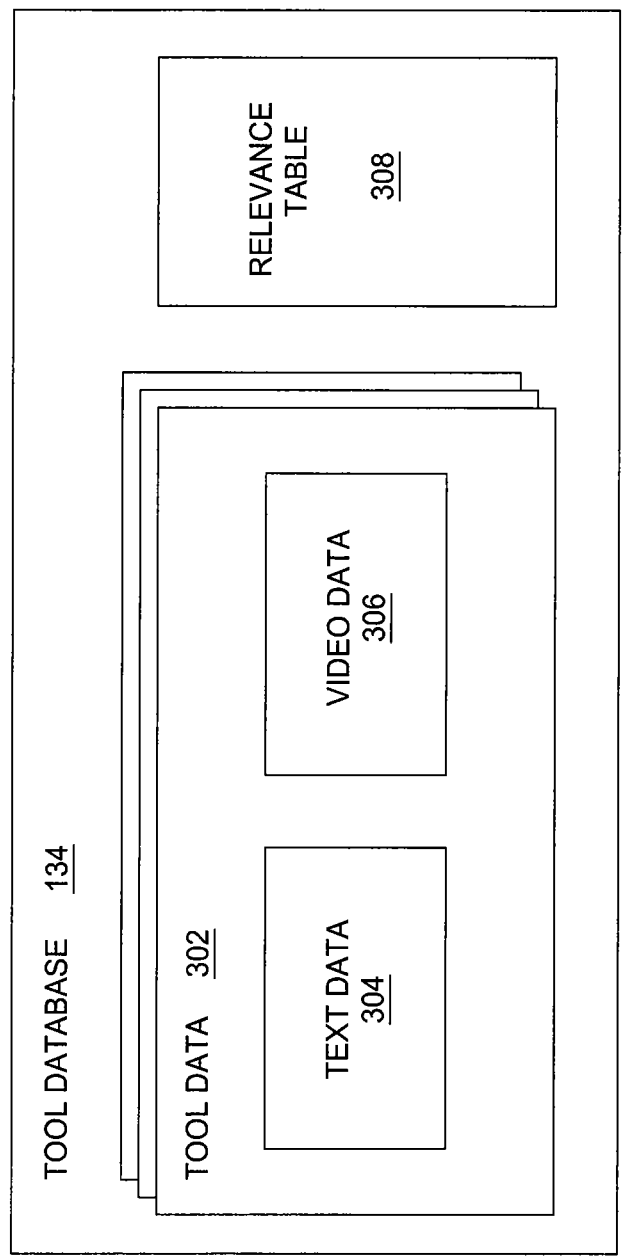
FIG. 3 is a conceptual diagram that illustrates a tool database, according to one embodiment of the invention.

FIG. 3 is a conceptual diagram that illustrates the tool database 134, according to one embodiment of the invention. As shown, the tool database 134 includes tool data 302 and a relevance table 308.

The tool data 302 includes text data 304 and video data 306 for each tool associated with the user application 120. The text data 304 for a particular tool is substantially similar to the text data 202 shown in FIG. 2. The text data 304 generally includes any "static" documents, and, accordingly, may include embedded images. In one embodiment, the tool data engine 122 retrieves the text data 304 from the tool database 134 and stores the text data 304 in the local tool data 124 as the text data 202. The video data 306 for a particular tool includes video clips that demonstrate usage of the tool. In one embodiment, the video data 306 specifies the location of video clips for the tool, where those video clips are located within the tool database 134 or located elsewhere.

As described above, the server engine 132 accesses the tool database 134 to retrieve video clips that may be relevant to the root video clip 204 or relevant to other video clips displayed in the tool data GUI. The server engine 132 identifies relevant video clips based on the relevance table 308. The relevance table 308 includes data that indicates a degree of relevance of each video clip specified in the video data 306 relative to each other video clip specified in the video data 306. Based on the data stored in the relevance table 308, the server engine 132 may identify videos that are relevant to the root video clip 404 and transmit these video clips to the tool data engine 122. The relevance table 308 is described in greater detail below in FIG. 4.

FIG. 4 is a conceptual diagram that illustrates an exemplary relevance table 308, according to one embodiment of the invention. As shown, the relevance table 308 includes three rows and three columns. The first, second, and third rows correspond to video clip 1, video clip 2, and video clip 3, respectively. The first, second, and third columns correspond to video clip 1, video clip 2, and video clip 3, respectively. The relevance table 308 includes a plurality of cells, where each cell resides at an intersection between one row and one column of the relevance table 308 and includes a "relevance value." For a given cell, the relevance value reflects the relevance of the video clip associated with the row of the cell to the video clip associated with the column of the cell. For example, cell 402 includes a relevance value of 0.5, indicating that video clip 2 has a relevance value of 0.5 relative to video clip 1. In another example, cell 404 includes a relevance value of 0.2, indicating that video clip 1 has a relevance value of 0.2 relative to video clip 3.

In one embodiment, the relevance value of a first video relative to a second video is based on the frequency with which the first video is viewed by a user (e.g., within the tool data GUI) immediately following the second video clip being viewed. In another embodiment, the relevance value of a first video relative to a second video may be based on a plurality of ratings received from users, where the ratings indicate the degree of relevance of the first video relative to the second video. In yet another embodiment, the relevance table 308 is manually determined by the software vendor, so that a specific list of videos will be associated with each tool.

Although the relevance table 308 shown in FIG. 4 includes only three rows and three columns, those skilled in the art will understand that a relevance table having any number of rows and columns corresponding to any number of video clips is within the scope of the invention.

Referring back now to FIG. 1B, once the server engine 132 determines one or more video clips that may be relevant to the root video clip 204 or to a previously viewed video clip, the server engine 132 transmits the relevant video clip(s) to the tool data engine 122. The tool data engine 122 may then display some or all of the received video clips to the end-user.

In addition to providing instructional information associated with a particular tool to an end-user, such as video clips, the tool data engine 122 is also configured to record additional video clips that demonstrate usage of a particular tool. Each additional video clip comprises a video screen capture of the application GUI while the end-user performs specific operations within the application GUI using the tool. Once the tool data engine 122 records an additional video clip, the tool data engine 122 transmits the additional video clips to the server engine 132 for storage in the tool database 134. Thus, the tool data engine 122 provides the end-user with the capability to add video content to the tool database 134.

The additional video clip may be recorded outside of the software application 120 using a separate software program. Alternatively, the additional video clip may be manually generated using an animation program, such as, for example, Flash. The software application 120 is configured to import video clips generated outside of the software application 120 into the tool database 134.

FIGS. 5A-5H provide detailed illustrations of the tool data GUI and the application GUI, as well as detailed descriptions of the functionality of those GUIs. Those skilled in the art will understand that any software program or programs, any hardware device or devices, or any combination of software and hardware device(s) configured to generate the tool data GUI and the application GUI described in FIGS. 5A-5H are within the scope of the invention described herein.

Figure 5A:
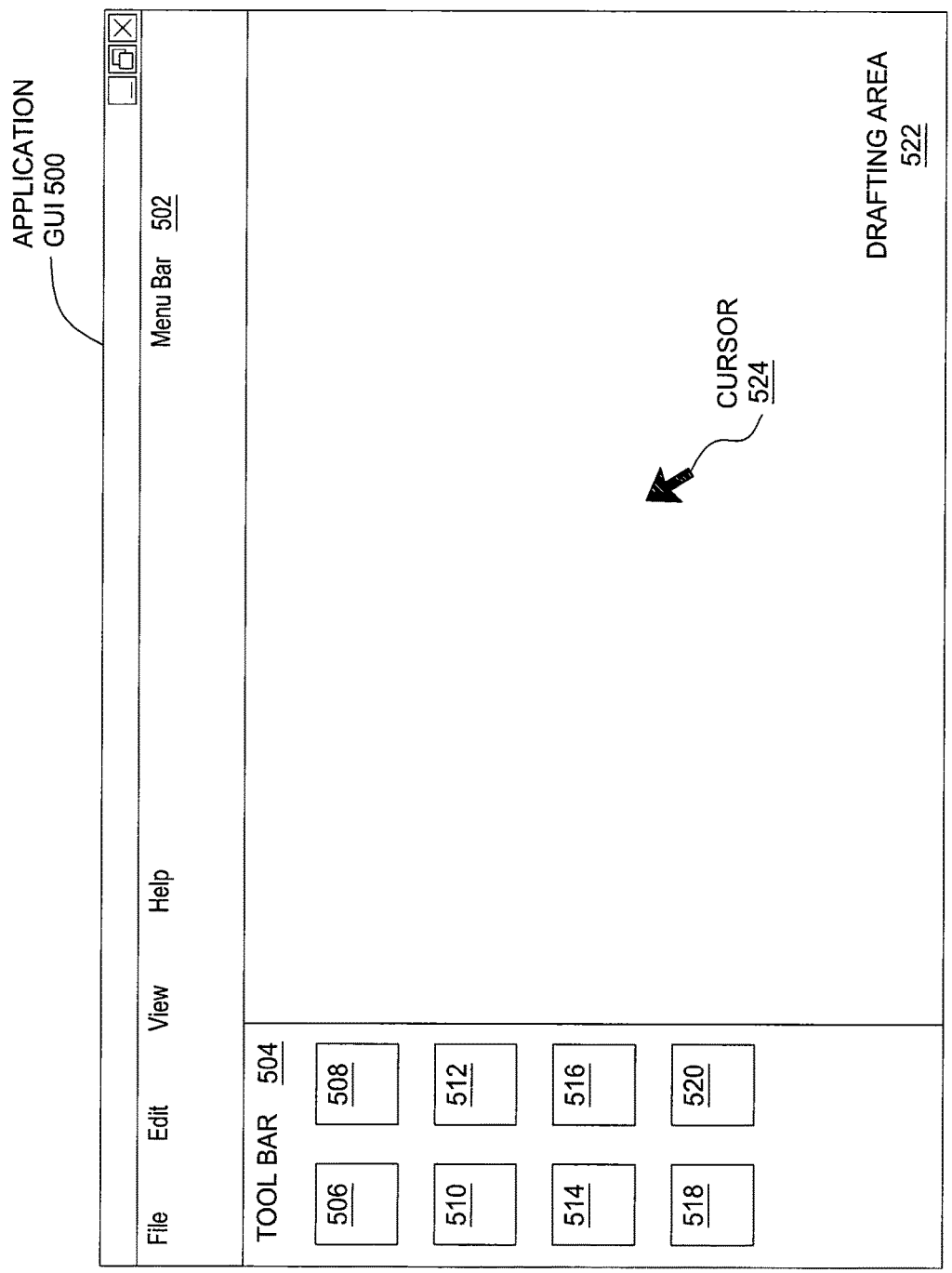
FIGS. 5A-5H are conceptual diagrams that illustrate a portion of a graphical user interface (GUI), according to various embodiments of the invention.

FIG. 5A is a conceptual diagram that illustrates a portion of an application graphical user interface (GUI) 500, according to one embodiment of the invention. As described, the user application 120 generates the application GUI 120. When the application 120 is a CAD application, the user application 120 generates the application GUI 500. Accordingly, the application GUI 500 represents just one example of an application GUI that could be generated by the user application. Those skilled in the art will recognize that different types of user applications may generate different types of application GUIs.

As shown, the application GUI 500 includes a menu bar 502, a tool bar 504, a cursor 524, and a drafting area 522. The cursor 524 can be manipulated by the end-user via the mouse 110 and can be used to select, drag, and/or drop different graphical items within the application GUI 500. The menu bar 502 includes different menus that can be accessed by the end-user via the cursor 524. The drafting area 522 displays graphical data, such as drawings or three-dimensional (3D) models that can be manipulated by the end-user via the cursor 524.

The tool bar 504 includes tool icons 506, 508, 510, 512, 514, 516, 518, and 520. The tool icons within the tool bar 504 represent different tools that may each be selected by the end-user in order to generate or manipulate the graphical data displayed within the drafting area 522. For example, the tool icon 518 could represent a circle tool that, when selected by the end-user, enables the end-user to draw a circle within the drafting area 522. When the end-user positions the cursor 524 over one of the tool icons within the toolbar 504, the tool data engine 122 accesses instructional information associated with the tool represented by that icon. The tool data engine 122 then displays a tool data GUI within the application GUI 500 that includes a portion of the instructional information, as described below in FIG. 5B.

Figure 5B:
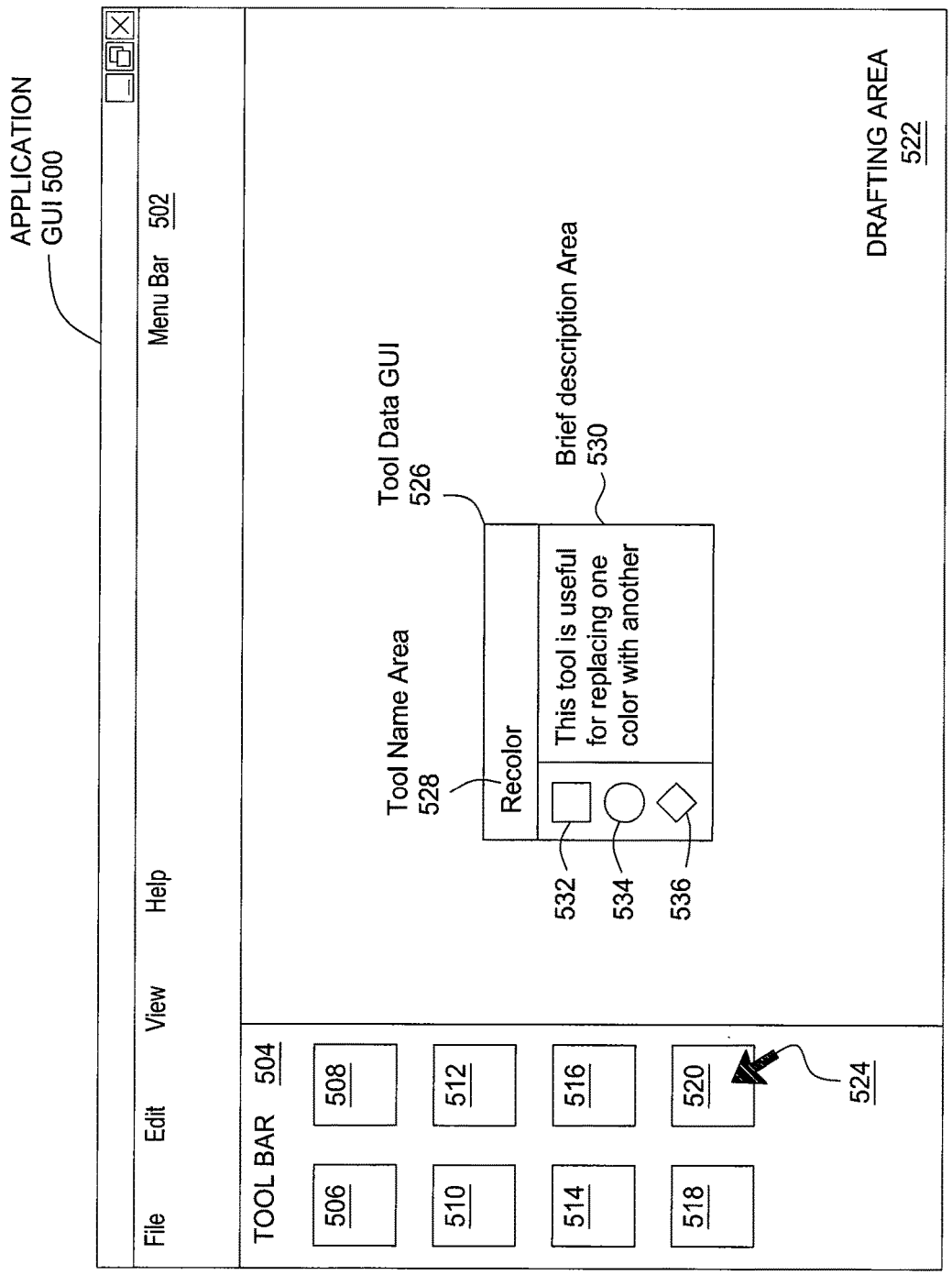

FIG. 5B is a conceptual diagram that illustrates the application GUI 500 of FIG. 5B, according to one embodiment of the invention. As shown, the application GUI 500 includes the same components as those shown in FIG. 5A. In addition, the application GUI 500 also includes a tool data GUI 526. When the end-user positions the cursor 524 over the tool icon 520 for a particular amount of time, the tool data engine 122 generates the tool data GUI 526. The tool data GUI 526 is associated with the tool represented by the tool icon 520.

The tool data engine 122 displays a different tool data GUI to the end-user when the end-user positions the cursor 524 over each different tool icon within the toolbar 504. However, for the sake of illustration, the following description is directed towards the tool data GUI 526 that is generated by the tool data engine 122 when the end-user positions the cursor 524 over the tool icon 520.

The tool data engine 122 superimposes the tool data GUI 526 over the application GUI 500 and may position the tool data GUI 526 anywhere within the application GUI 500 or anywhere within an available region of the display device 112. In general, the tool data engine 122 causes the tool data GUI 526 to occupy a position near the cursor 524 and the selected tool icon 520 such that the tool data GUI 526 can allow for a quick secondary selection without obscuring other GUI elements in the toolbar 504.

In one embodiment the data tool GUI is displayed at full opacity and is dismissed as soon as the cursor leaves the icon

520. In another embodiment, the tool data engine 122 displays the tool data GUI 526 with a particular alpha value that is determined based on the distance of the cursor 524 from the tool data GUI 526. In one embodiment, the alpha value of the tool data GUI 526 is given by Equation 1:

$$\text{Alpha} = \frac{100 - (D - D_{min})}{100} \quad \text{Equation 1}$$

According to Equation 1, the alpha value of the tool data GUI is based on the distance D between the cursor 524 and the tool data GUI 526 as well as the minimum value, $D_{min}$, that D has taken on since the tool data engine 122 displayed the tool data GUI 526.

In the embodiment shown, the tool data GUI 526 includes a tool name area 528, a brief description area 530, a detailed description button 532, a video clip button 534, and a record button 536. The tool name area 528 displays the name of the tool that corresponds to the tool icon 520. The tool corresponding to the tool icon 520 is referred to hereinafter simply as the "tool." The brief description area 530 includes the brief description of the tool that is retrieved from the local tool data 124 by the tool data engine 122, as described in conjunction with FIG. 1B.

The detailed description button 532 can be selected by the end-user using the cursor 524 in order to cause the tool data GUI 526 to display a detailed description of the tool instead of displaying the brief description of the tool, as described below in conjunction with FIG. 5C. The video clip button 534 can be selected by the end-user using the cursor 524 in order to cause the tool data GUI 526 to display the root video clip 204 associated with the tool, as described in conjunction with FIGS. 5D-5E. In one embodiment the Tool Data GUI 526 converts to a modal dialog box when additional information is requested (button 532 or 534 is selected). The modal dialog box will remain posted until explicitly dismissed. New detailed instructional information will be directed to the dialog box until the dialog box is explicitly dismissed. Once the tool data GUI 526 is posted, it may be resized and repositioned for improved viewing or working with the software application 120. The record button 536 can be selected by the end-user using the cursor 524 in order to cause the tool data GUI 526 to record a video clip that demonstrates usage of the tool, as described in conjunction with FIGS. 5F-5H. In another embodiment, the detailed information is accessed by using a hotkey when the tool data GUI 526 is showing the brief description. For example, 'V' could show the detailed video, 'T' could show the detailed text, and 'R' could begin recording a video clip. In another embodiment, the cursor could dwell over the tool icon 520 for a threshold period of time, at which point the detailed video content would be displayed.

Figure 5C:
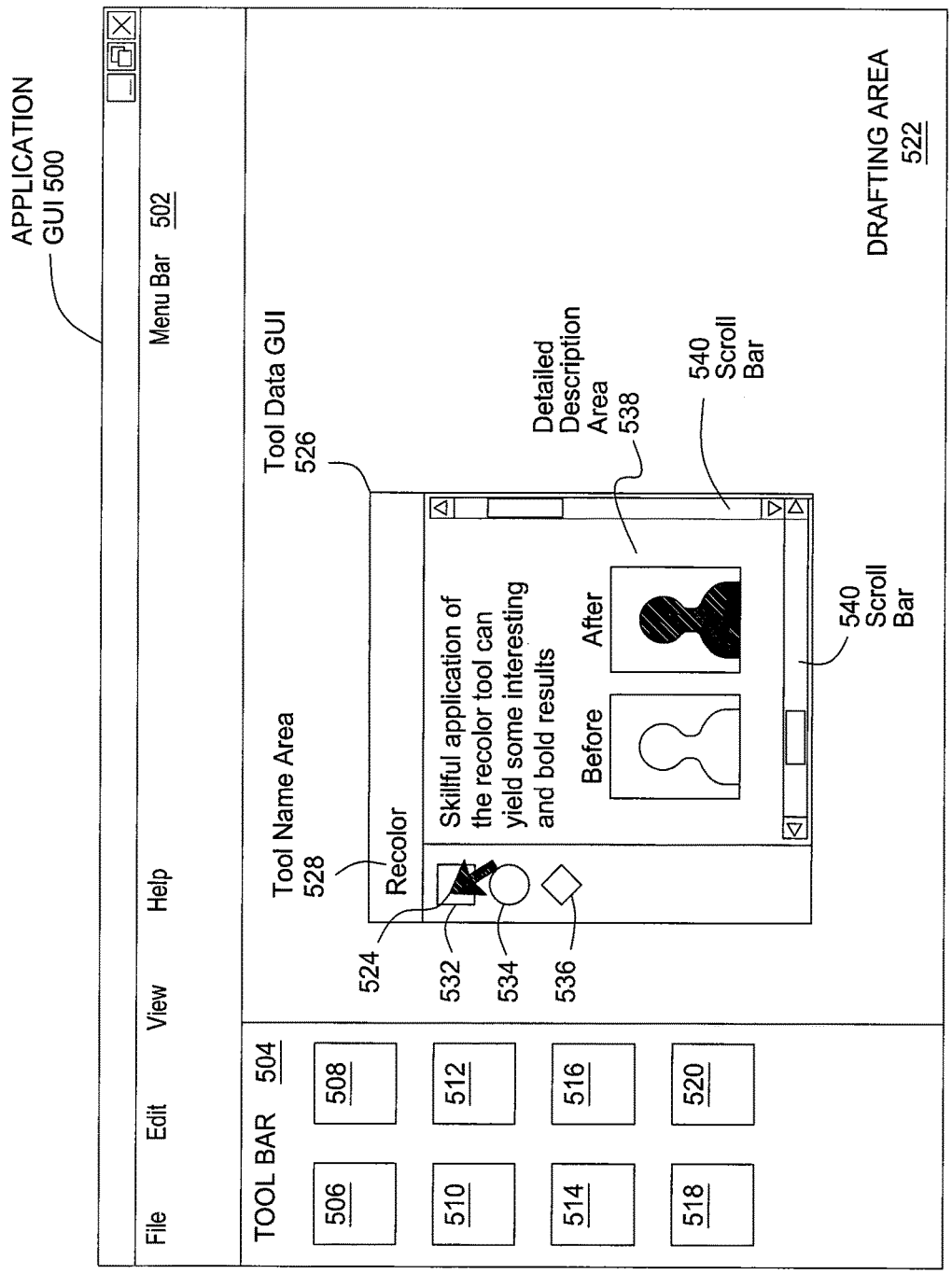

FIG. 5C is a conceptual diagram that illustrates the application GUI 500 of FIGS. 5A-5B, according to one embodiment of the invention. As shown, the application GUI 500 includes some of the same components as those shown in FIG. 5B. However, tool data GUI 526 now includes a detailed description area 538.

When the end-user selects the detailed description button 532 using the cursor 524, the tool data engine 122 accesses the local tool data 124 shown in FIGS. 1B and 2 and retrieves a detailed description of the tool from the text data 202 included within the local tool data 124. The tool data engine 122 then generates the detailed description area 538 that displays the detailed description of the tool. The detailed description of the tool includes text data and may also include images demonstrating the effects that using the tool may have on data associated with the user application 120. The tool data engine 122 also generates a horizontal scroll bar 540 and a vertical scroll bar 542 that allow the end-user to scroll horizontally and vertically, respectively, within the detailed description area 538.

The video clip button 534 can be selected by the end-user using the cursor 524 in order to cause the tool data GUI 526 to display the root video clip 204 associated with the tool, as described in greater detail below in conjunction with FIGS. 5D-5E.

Figure 5D:
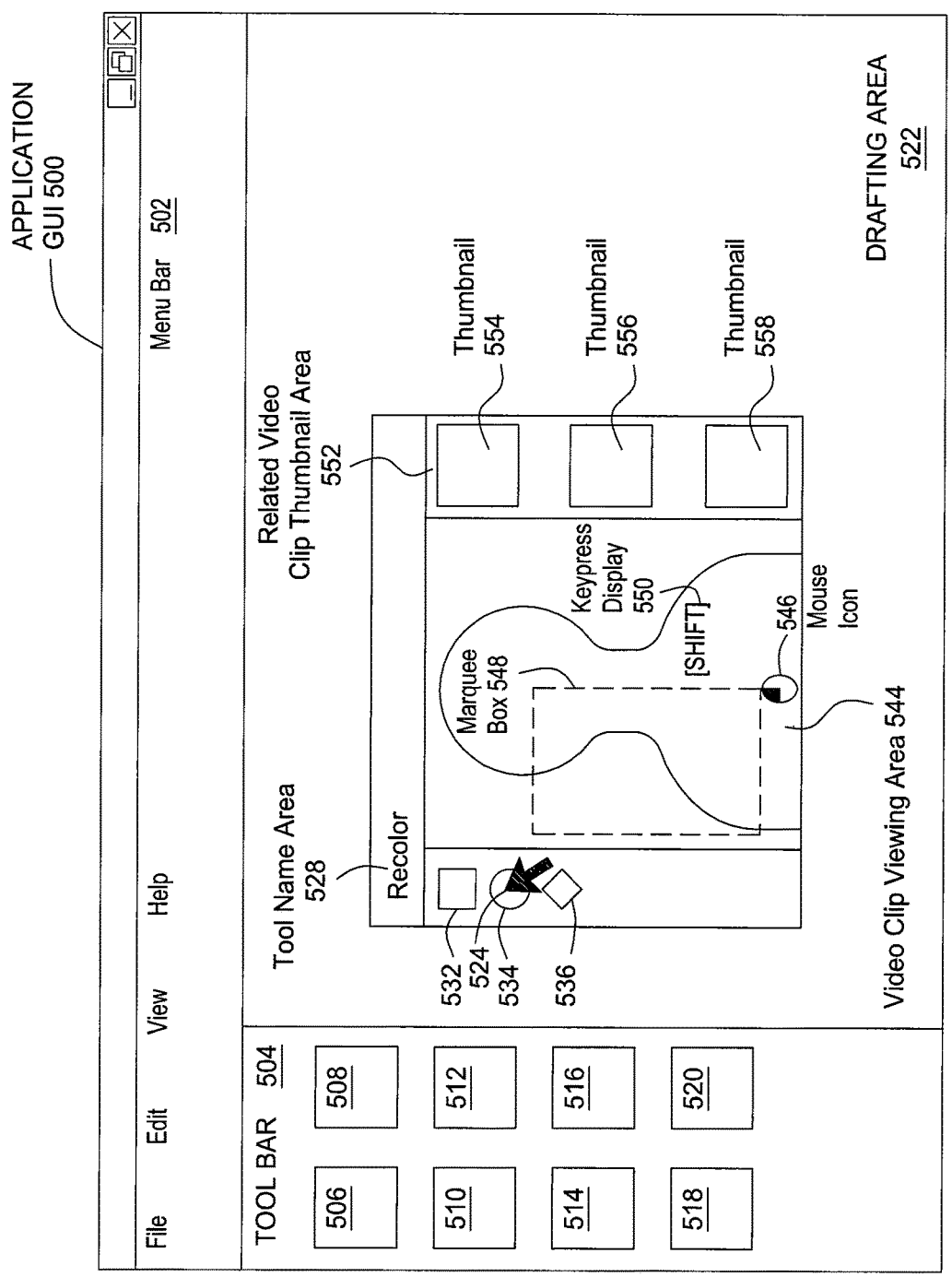

FIG. 5D is a conceptual diagram that illustrates the application GUI 500, according to one embodiment of the invention. As shown, the application GUI 500 includes some of the same components as those shown in FIGS. 5A-5C. However, tool data GUI 526 now includes a video clip viewing area 544 and a relevant video clip thumbnail area 552. In one embodiment, the relevant video clip thumbnail area 552 also includes a title and a textual description of each video clip for which a thumbnail is displayed.

When the end-user selects the video clip button 534, the tool data engine 122 accesses the local tool data 124 shown in FIG. 1B and retrieves the root video clip 204 included within the local tool data 124. The root video clip 204 demonstrates usage of the tool. The tool data engine 122 displays the root video clip 204 within the video clip viewing area 544. The root video either begins playing automatically, or only shows the first frame, and awaits user input to being playback.

The root video clip 204 comprises a video screen capture or produced video of data being manipulated using the tool. The root video clip 204 shows the position of the cursor relative to the data that is being manipulated as a graphic overlay consisting of a mouse icon 546. The mouse icon 546 illustrates which mouse buttons are being depressed by highlighting a region of the mouse icon 546 that corresponds to those buttons. The root video clip 204 shows particular keys that are being pressed (e.g., keys on a keyboard) within a keypress display 550. In this fashion, the root video clip 204 conveys to the end-user the precise actions that are being performed when the data is manipulated using the tool of interest. Standard playback controls are provided to allow the user to play, pause, and seek within the video.

In the exemplary illustration provided in FIG. 5D, the video clip viewing area 544 shows the effects of a marquee tool that is used to select a region of an image 545. The marquee tool generates a marquee box 548 in order to select the region of the image 545. In addition, the mouse icon 546 indicates that the left mouse button is being pressed, while the keypress display 550 indicates that the shift key is being pressed. Although the exemplary illustration shown in FIG. 5D is directed towards the usage of a marquee tool, those skilled in the art will understand that a video clip that illustrates the usage of any tool associated with the user application 120 could be displayed within the video clip viewing area 544.

When the tool data engine 122 retrieves the root video clip 204, the tool data engine 122 also requests additional video clips from the server engine 132 within the server computing device 104. As described in conjunction with FIGS. 1B and 3-4, the server engine 132 accesses the relevancy table 308 within the server data base 134 and identifies one or more video clips that may be relevant to the root video clip 204. The server engine 132 then transmits these additional video clips to the tool data engine 132.

Upon receipt of the additional video clips from the server engine 132, the tool data engine 122 generates thumbnail images of the additional video clips and displays the thumbnail images within the relevant video clip thumbnail area 552. The relevant video clip thumbnail area 552 includes exemplary thumbnail images 554, 556, and 558. The end-user may select one of the thumbnail images displayed in the relevant video clip thumbnail area 552 and then view the video clip associated with that thumbnail image within the video clip viewing area 544. In another variation, a short title, textual description and other data (such as author name, frequency of viewing, satisfaction score) for each of the video clips is displayed along with the thumbnails (554, 556, 558).

When the root video clip 204 has stopped playing, the tool data engine 122 causes the video clip viewing area 544 to display data associated with video clips that are relevant to the root video clip 204, as described in greater detail below in conjunction with FIG. 5E.

Figure 5E:
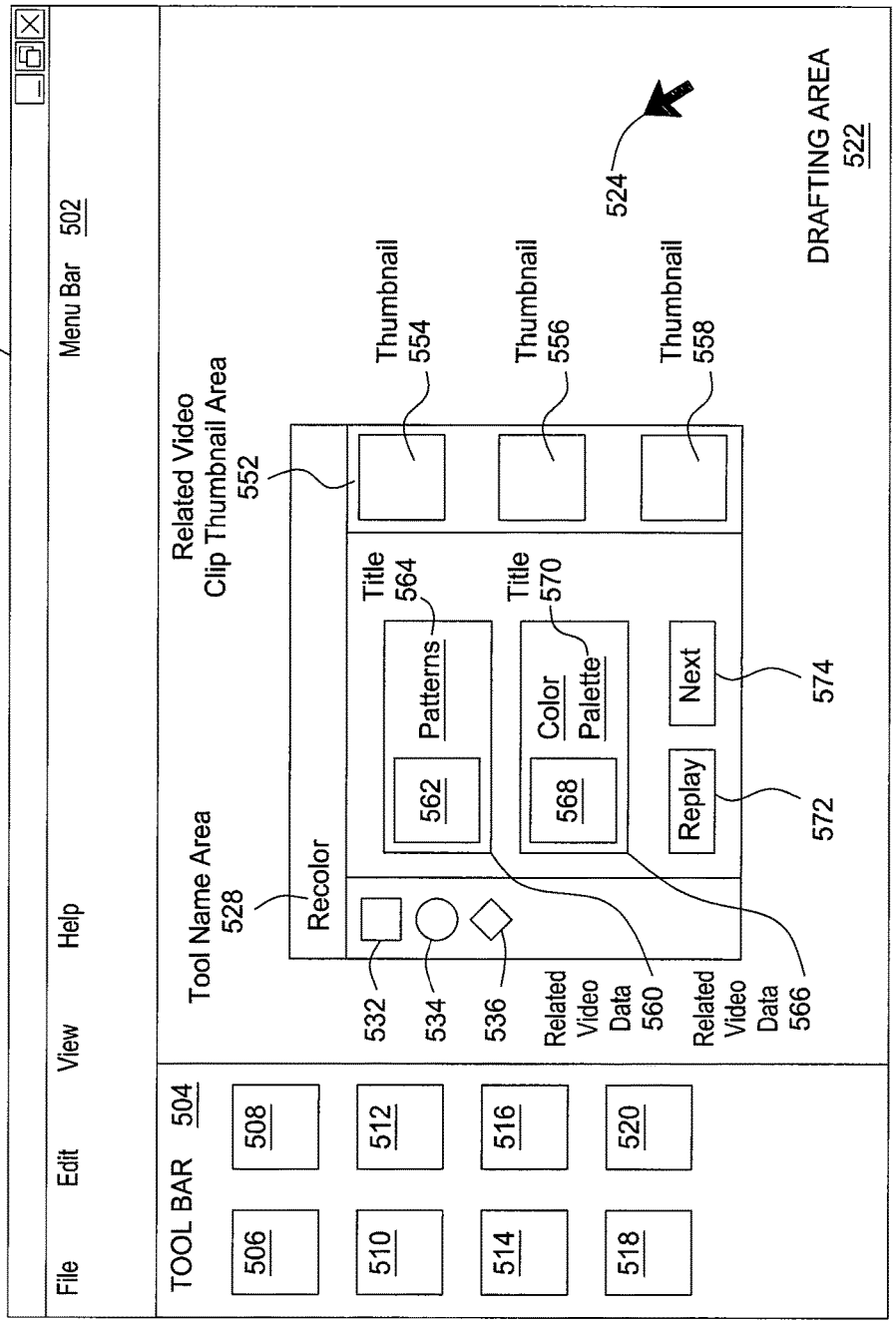

FIG. 5E is a conceptual diagram that illustrates the application GUI 500, according to one embodiment of the invention. As shown, the application GUI 500 includes some of the same components as shown in FIG. 5D. In addition, the video viewing area 544 now includes relevant video data 560 and relevant video data 566.

Relevant video data 560 and 562 are associated with video clips provided by the server engine 132 in response to the tool data engine 122 requesting additional video clips. Relevant video data 560 includes a thumbnail image 562 that represents a video clip, as well as a title 564 associated with the video clip. Relevant video data 566 includes a thumbnail image 562 that represents another video clip, as well as a title 570 associated with that video clip. The relevant video data 560 and 566 may be associated with the thumbnail images included within the relevant video clip thumbnail area 552 or, alternatively, may be associated with other video clips. Video viewing area 544 also includes a replay button 572 and a next button 574. The replay button 572 allows the end-user to replay the last video clip played in the video viewing area 544, while the next button 574 allows the end-user to proceed to the next most relevant video clip in a sequence of relevant video clips.

Figure 5F:
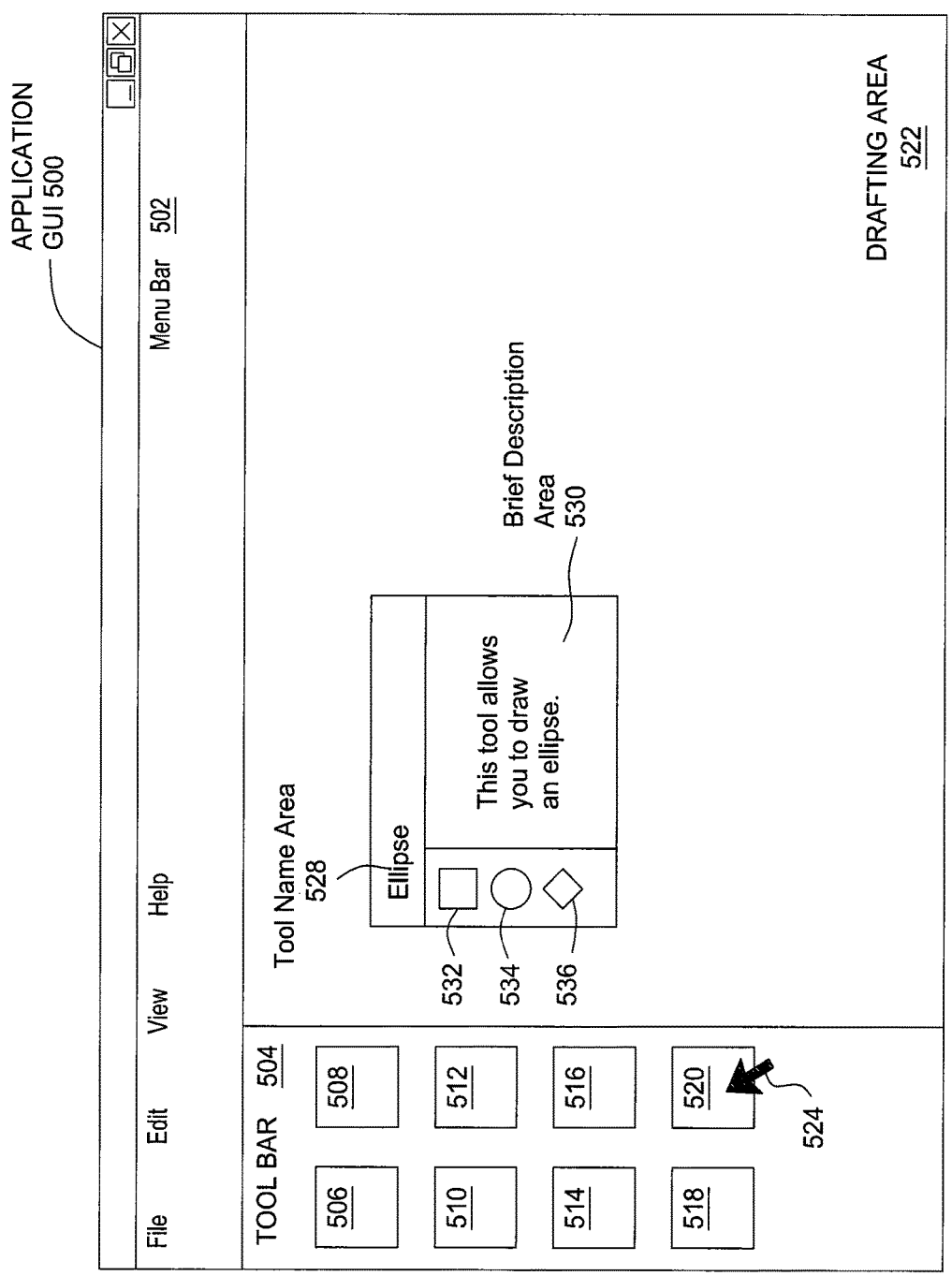
Figure 5G:
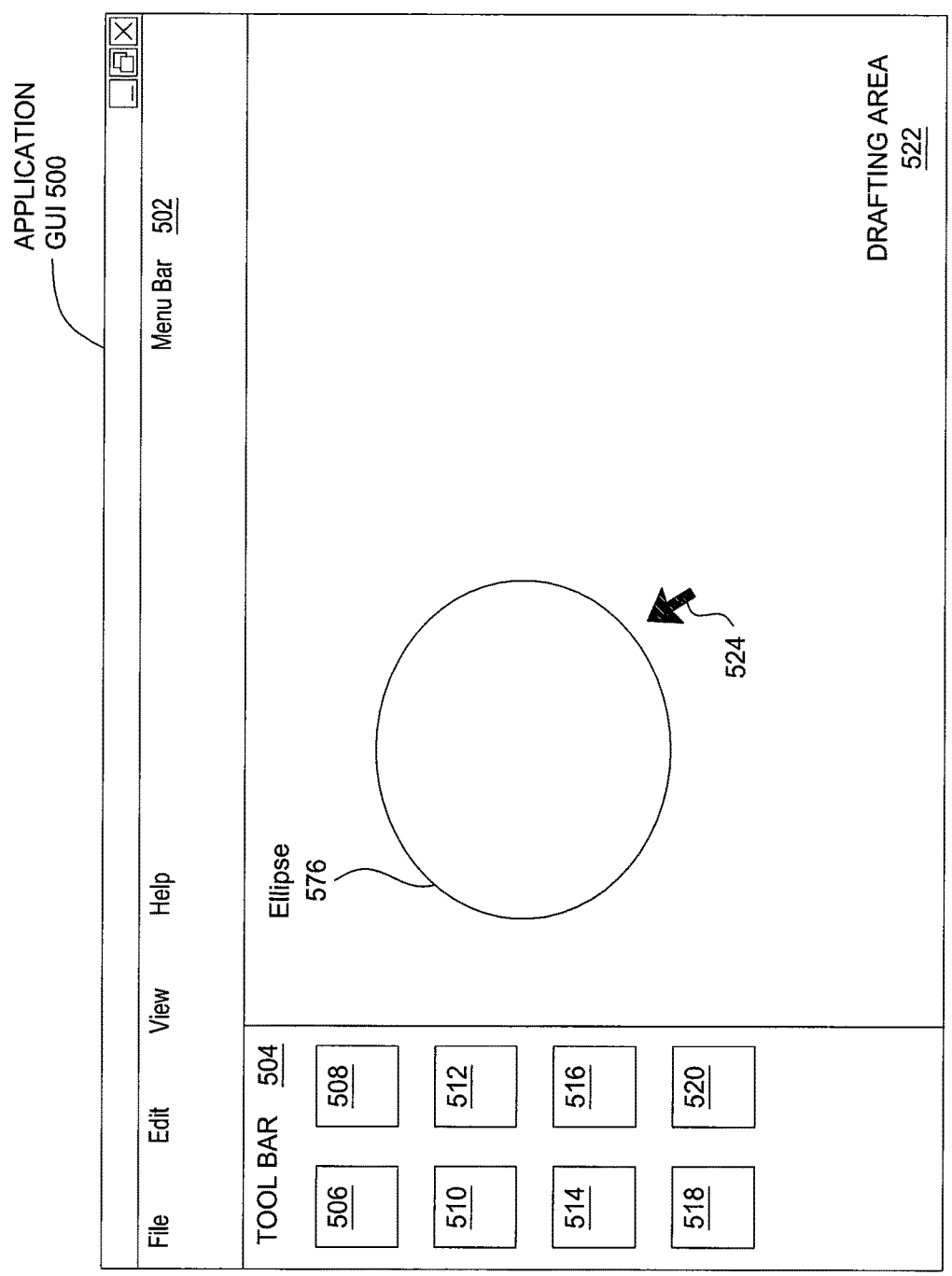

The end-user may also record video clips and upload those video clips to the tool database 134. When the end-user selects the record button 536 using the cursor 524, the tool data engine 122 may initiate recording of a video clip. FIGS. 5F and 5G are conceptual diagrams that illustrate frames of a video clip captured by the tool data engine 122, according to one embodiment of the invention.

In FIG. 5F, the end-user selects an ellipse tool represented by the tool icon 520. In FIG. 5G, the end-user draws an ellipse 576 using the cursor 524. The end-user may click the left mouse button and then drag the cursor 524 across the drafting area 522 in order to generate the ellipse 576 using the ellipse tool. The end-user may also press the shift key in order to generate an ellipse having certain dimensions. When the end-user has finished recording the video clip, the end-user may indicate to the tool data engine 122 that recording is complete. In one embodiment, the end-user presses the space bar to indicate that recording is complete. The end-user may then review the recorded video clip, as shown in FIG. 5H.

Figure 5H:
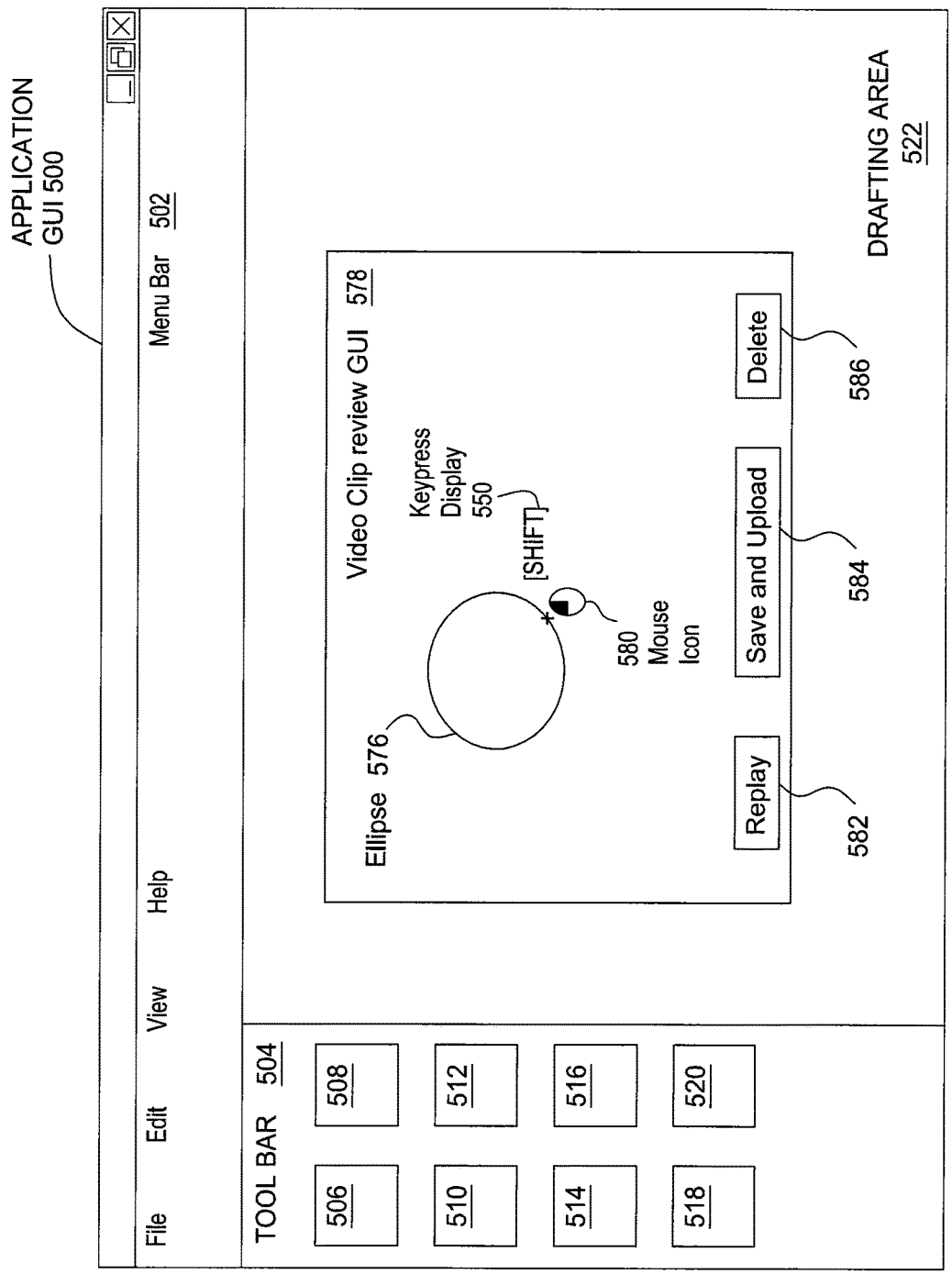

FIG. 5H is a conceptual diagram that illustrates the application GUI 500, according to one embodiment of the invention. As shown, the application GUI 500 includes some of the same components as shown in FIG. 5D. In addition, the application GUI 500 now includes a video clip review GUI 578.

The video clip review GUI 578 displays the video clip previously recorded by the tool data engine 122. The previously recorded video clip shows the ellipse 576 being drawn. The mouse icon 580 indicates that the ellipse 576 can be drawn by pressing the left mouse button. The keypress display 550 further indicates that the shift key can be pressed in conjunction with the left mouse button in order to draw the ellipse 576. The video clip review GUI 578 also includes replay button 582, save and upload button 584, and delete button 586.

When the end-user selects the replay button 582, the tool data engine 122 replays the previously recorded video clip. When the end-user selects the save and upload button 584, the tool data engine 122 saves and post-processes the previously recorded video clip and then uploads the processed video clip to the tool database 134. The post processing allows user input, such as typing a description, adding a title, adding an audio narration, adding captions, or editing the actual video When uploading, the user has the option to publish the video with a few different distribution scopes including: none (only current user can access the video), an internal group within his organization, within the entire current organization, an external group, a language-specific group (e.g., English, Spanish, French) and worldwide distribution. In addition to the graphical overlays (mouse position, mouse button press events, keyboard events), mouse click audio events and keyboard press events may be added to the video to enhance its playback. In addition, the recorded author's spoken words may be transcribed into closed-captioning text which can serve as searchable data or can be displayed on top of the video during playback. Note that the authored video and accompanying data is automatically associated with the tool that triggered the recording (using the record button 536). This streamlines the authoring process and potentially reduces mistakes during the tool to video association phase. When the end-user selects the delete button 586, the tool data engine 122 deletes the previously recorded video clip.

Through the techniques described herein, the end-user is provided with detailed instructional information pertaining to use of a different tools within a software application. Additionally, the end-user may generate additional instructional information and upload that information to a server. Other end-users may then access this information. The instructional information stored on the server is thereby not limited to the information initially associated with the software application. The methods employed by the tool data engine 122 for providing instructional information to the end-user and for recording new instructional information from the end-user are described below in conjunction with FIGS. 6, 7A, 7B, 7C, and 7D.

Figure 6:
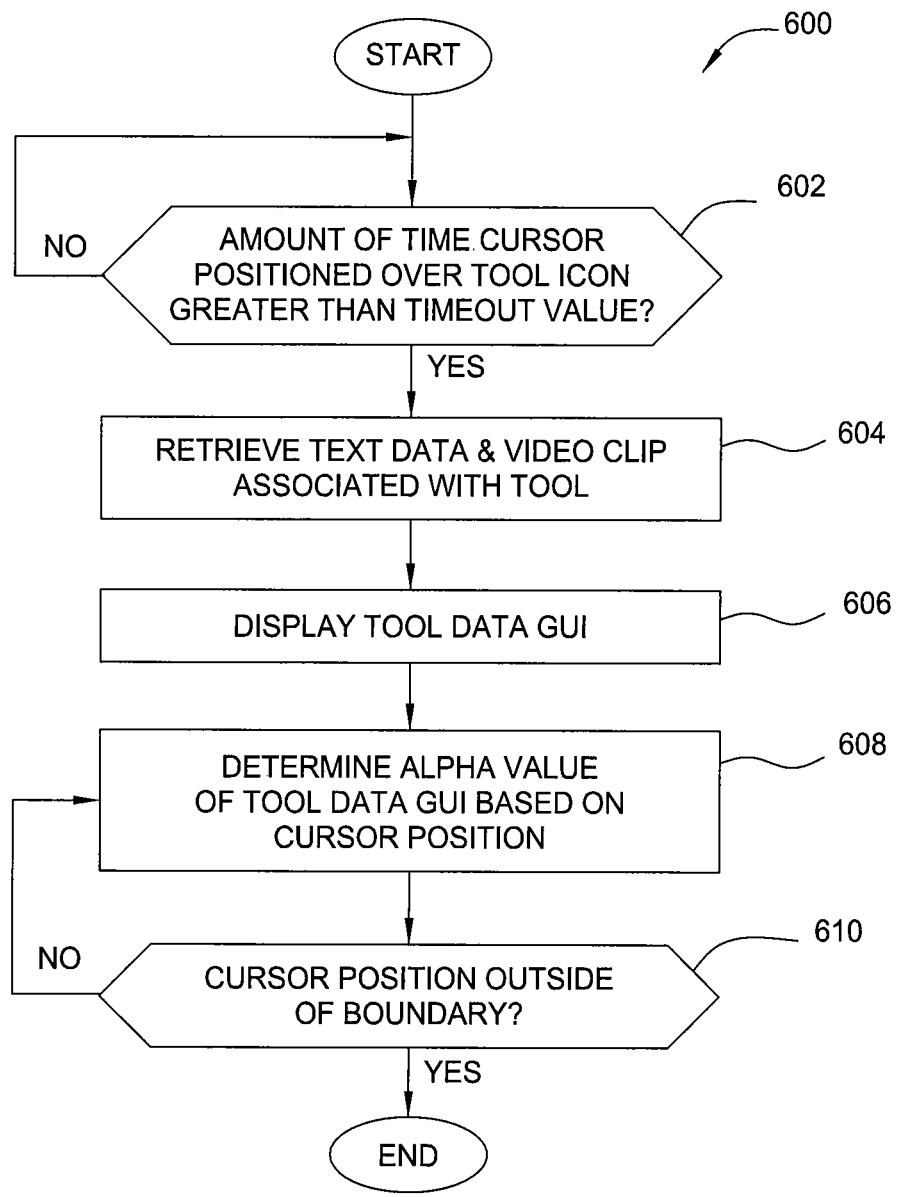
FIG. 6 is a flowchart of method steps for displaying a tool data GUI, according to one embodiment of the invention.

FIG. 6 is a flowchart of method steps for displaying a tool data GUI, according to one embodiment of the invention. Although the method steps are described in conjunction with the systems of FIGS. 1A and 1B, persons skilled in the art will understand that any system configured to perform the method steps, in any order, is within the scope of the invention.

As shown, the method 600 begins at step 602, where the tool data engine 122 remains until the amount of time that the cursor 524 has been positioned over one of the tool icons is greater than a timeout value. Once the cursor 524 has been positioned over one of the tool icons for longer than the timeout value, the method 600 proceeds to step 604, where the tool data engine 122 retrieves local tool data 124 associated with the tool. The local tool data 124 includes the text data 202 and the root video clip 204 associated with the tool.

At step 606, the tool data engine 122 superimposes the tool data GUI 526 over the application GUI 500 with which the tool is associated. At step 608, the tool data engine 122 determines the alpha value of the tool data GUI 526 based on the position of the cursor 524. In one embodiment, the tool data engine 122 determines the alpha value of the tool data GUI 526 based on Equation 1. At step 610, the tool data engine 122 determines whether the position of the cursor 524 is outside of a predetermined boundary. The boundary may be pre-set or manually determined. When the position of the cursor 524 is not outside of the boundary, the method 600 returns to step 608 and proceeds as described above. When the position of the cursor 524 is outside of the boundary, the tool data engine 122 stops displaying the tool data GUI 526, and the method 600 ends.

When the tool data engine 122 displays the tool data GUI 526 associated with a particular tool, the tool data engine 122 performs the method described below in conjunction with FIGS. 7A, 7B, 7C, and 7D.

Figure 7A:
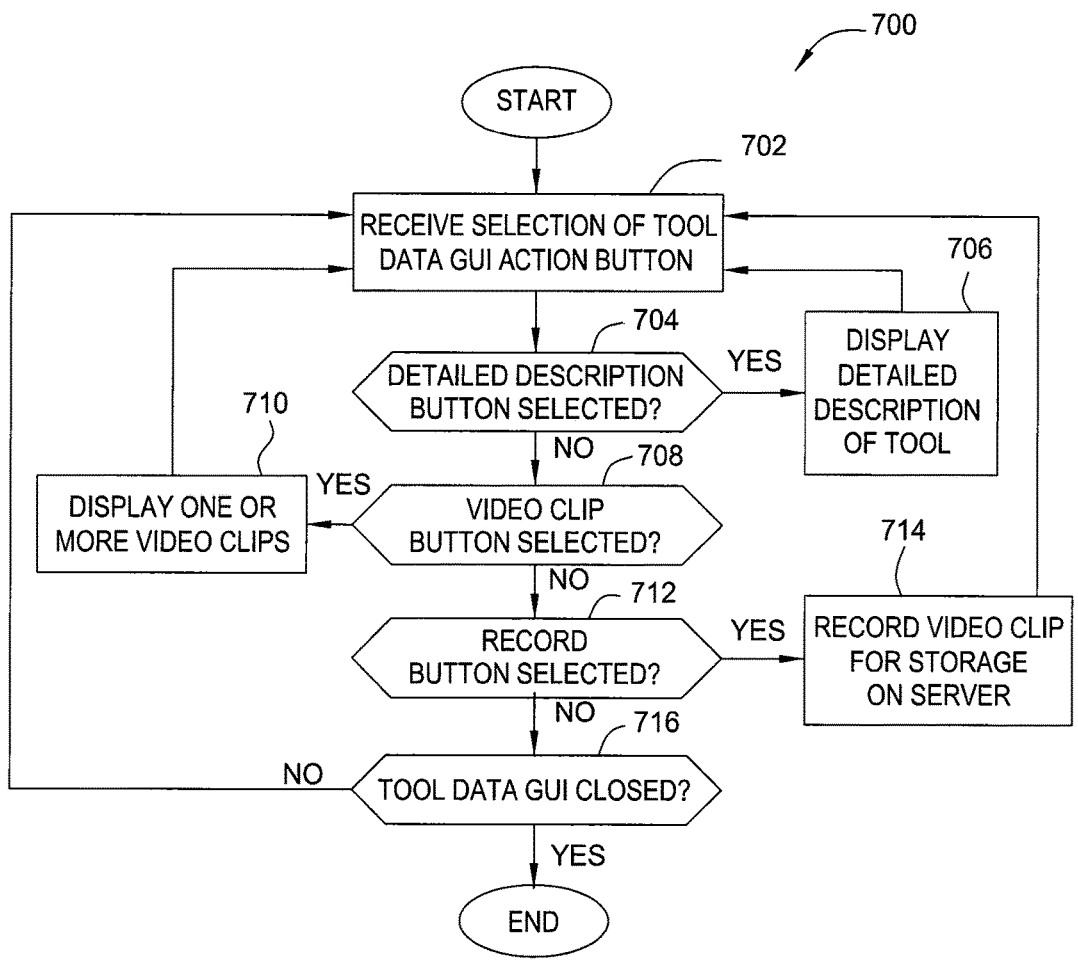
FIG. 7A is a flowchart of method steps for performing various operations associated with a tool data GUI, according to one embodiment of the invention.

FIG. 7A is a flowchart of method steps for performing various operations associated with a tool data GUI, according to one embodiment of the invention. Although the method steps are described in conjunction with the systems of FIGS. 1A and 1B, persons skilled in the art will understand that any system configured to perform the method steps, in any order, is within the scope of the invention.

As shown, the method 700 begins at step 702, where the tool data engine 122 receives a selection of a tool data GUI action button. The action button could be the detailed description button 532, the video clip button 534, or the record button 536.

At step 704, the tool data engine 122 determines whether the detailed description button 532 was selected. If the tool data engine 122 determines that the detailed description button 704 was selected, then the method 700 proceeds to step 706. At step 706, the tool data engine 122 displays a detailed description of the tool with which the tool data GUI 526 is associated. Step 706 is described in greater detail in conjunction with FIG. 7B. If the tool data engine 122 determines that the detailed description button 532 was not selected, then the method 700 proceeds to step 708.

At step 708, the tool data engine 122 determines whether the video clip button 534 was selected. If the tool data engine 122 determines that the video clip button 534 was selected, then the method 700 proceeds to step 710. At step 710, the tool data engine 122 displays one or more video clips within the tool data GUI 526. Step 710 is described in greater detail in conjunction with FIG. 7C. If the tool data engine 122 determines that the video clip button 534 was not selected, then the method 700 proceeds to step 712.

At step 712, the tool data engine 122 determines whether the record button 536 was selected. If the tool data engine 122 determines that the record button 536 was selected, then the method 700 proceeds to step 714. At step 714, the tool data engine 122 records a video clip for storage on the server computing device 104. Step 714 is described in greater detail in conjunction with FIG. 7D. If the tool data engine 122 determines that the record button 536 was not selected, then the method 700 proceeds to step 716.

At step 716, the tool data engine 122 determines whether the tool data GUI 526 has been closed by the end-user. If the tool data engine 122 determines that the tool data GUI 526 has not been closed, then the method 700 returns to step 702 and proceeds as described above. If the tool data engine 122 determines that the tool data GUI 526 has been closed, then the method 700 ends.

Figure 7B:
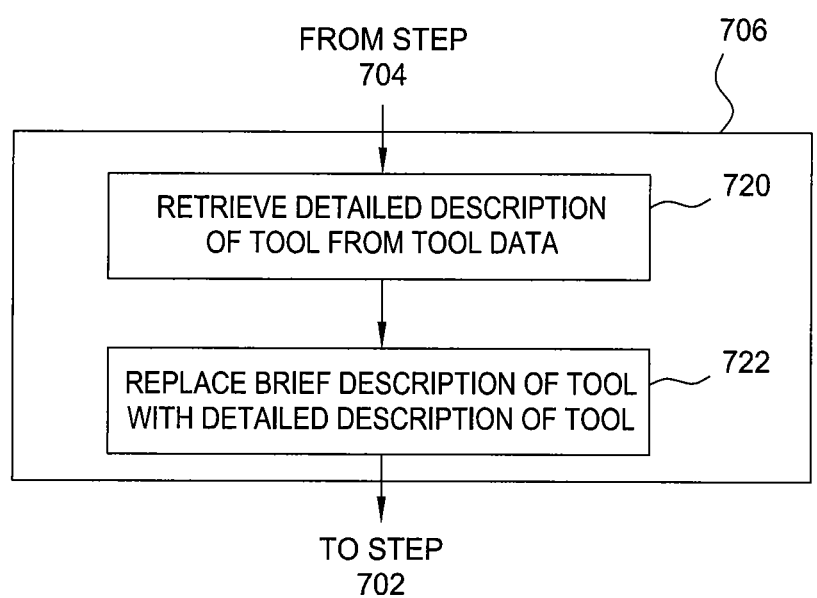
FIG. 7B is a flowchart of method steps for displaying a detailed description of a tool within a tool data GUI, according to one embodiment of the invention.

FIG. 7B is a flowchart of method steps for displaying a detailed description of a tool within a tool data GUI, according to one embodiment of the invention. Although the method steps are described in conjunction with the systems of FIGS. 1A and 1B, persons skilled in the art will understand that any system configured to perform the method steps, in any order, is within the scope of the invention.

As shown, FIG. 7B illustrates step 706 of the method 700 described above in conjunction with FIG. 7A. The tool data engine 122 performs step 706 in order to display a detailed description of a particular tool for which the tool data GUI 526 has been displayed. Step 706 includes steps 720 and 722.

At step 720, the tool data engine 122 retrieves the detailed description of the tool from the text data 202 within the local tool data 134. The detailed description of the tool may include text and/or pictures that describe and/or illustrate usage of the tool. At step 722, the tool data engine 122 replaces the brief description of the tool with the detailed description of the tool. The method 700 then returns to step 702 and proceeds as described in conjunction with FIG. 7A.

Figure 7C:
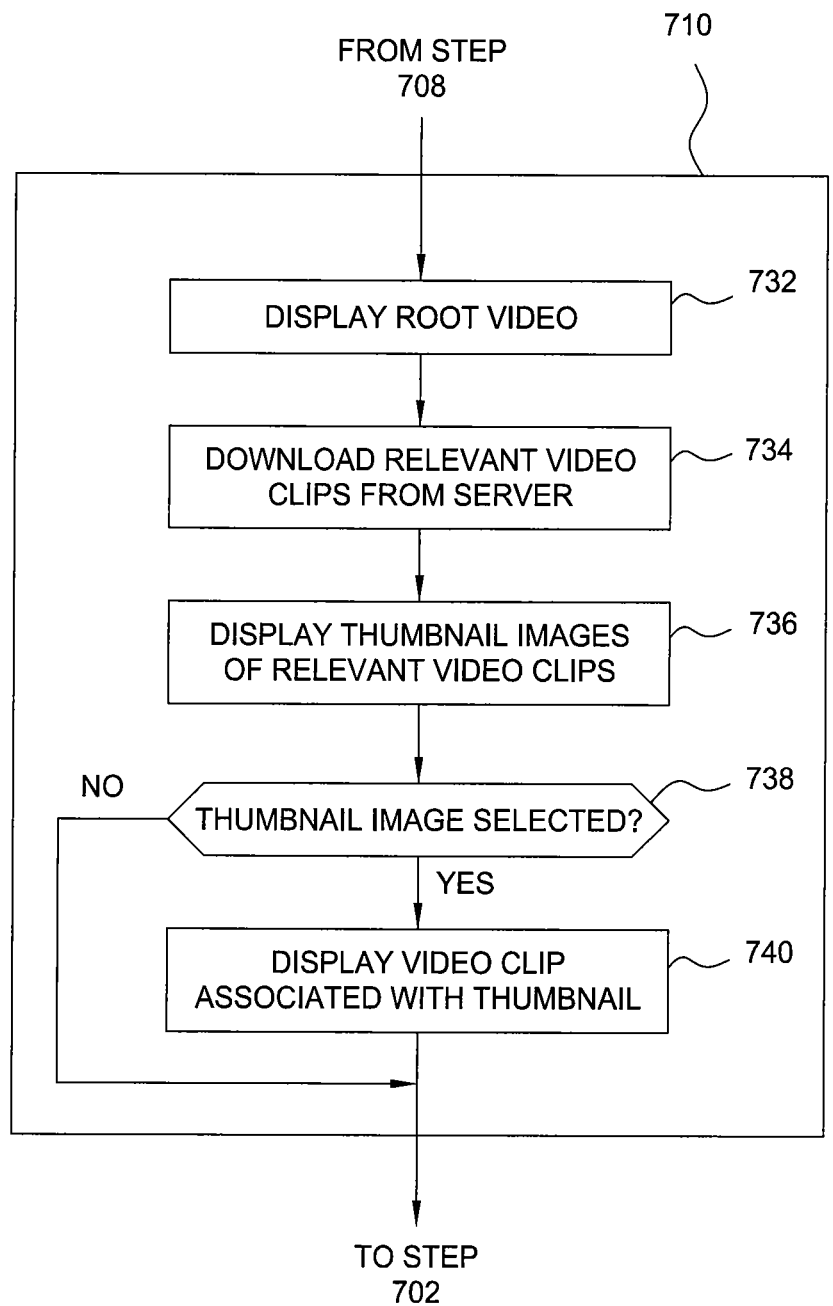
FIG. 7C is a flowchart of method steps for displaying a video clip within a tool data GUI, according to one embodiment of the invention.

FIG. 7C is a flowchart of method steps for displaying a video clip within a tool data GUI, according to one embodiment of the invention. Although the method steps are described in conjunction with the systems of FIGS. 1A and 1B, persons skilled in the art will understand that any system configured to perform the method steps, in any order, is within the scope of the invention.

As shown, FIG. 7C illustrates step 710 of the method 700 described above in conjunction with FIG. 7A. The tool data engine 122 performs step 710 in order to display one or more video clips associated with the tool for which the tool data GUI 526 has been displayed. Step 710 includes steps 732, 734, 736, 738, and 740.

At step 732, the tool data engine 122 displays the root video clip 204 within the tool data GUI 526. The root video clip 204 includes basic instructional information regarding use of a selected tool. At step 734, the tool data engine 122 retrieves related, or relevant video clips, from the server computing device 104. The server engine 132 retrieves the relevant video clips from the tool database 134 based on the relevance table 308. At step 736, the tool data engine 122 displays one or more thumbnail images of video clips that are relevant to the root video clip 204.

At step 738, the tool data engine 122 determines whether one of the displayed thumbnail images has been selected. When the tool data engine 122 determines that a thumbnail image has been selected, then the method 700 proceeds to step 740. At step 740, the tool data engine 122 displays the video clip associated with the selected thumbnail.

At step 738, if the tool data engine 122 determines that one of the displayed thumbnail images has not been selected, then the method 700 skips step 740. The method 700 then returns to step 702 and proceeds as described in conjunction with FIG. 7A.

Figure 7D:
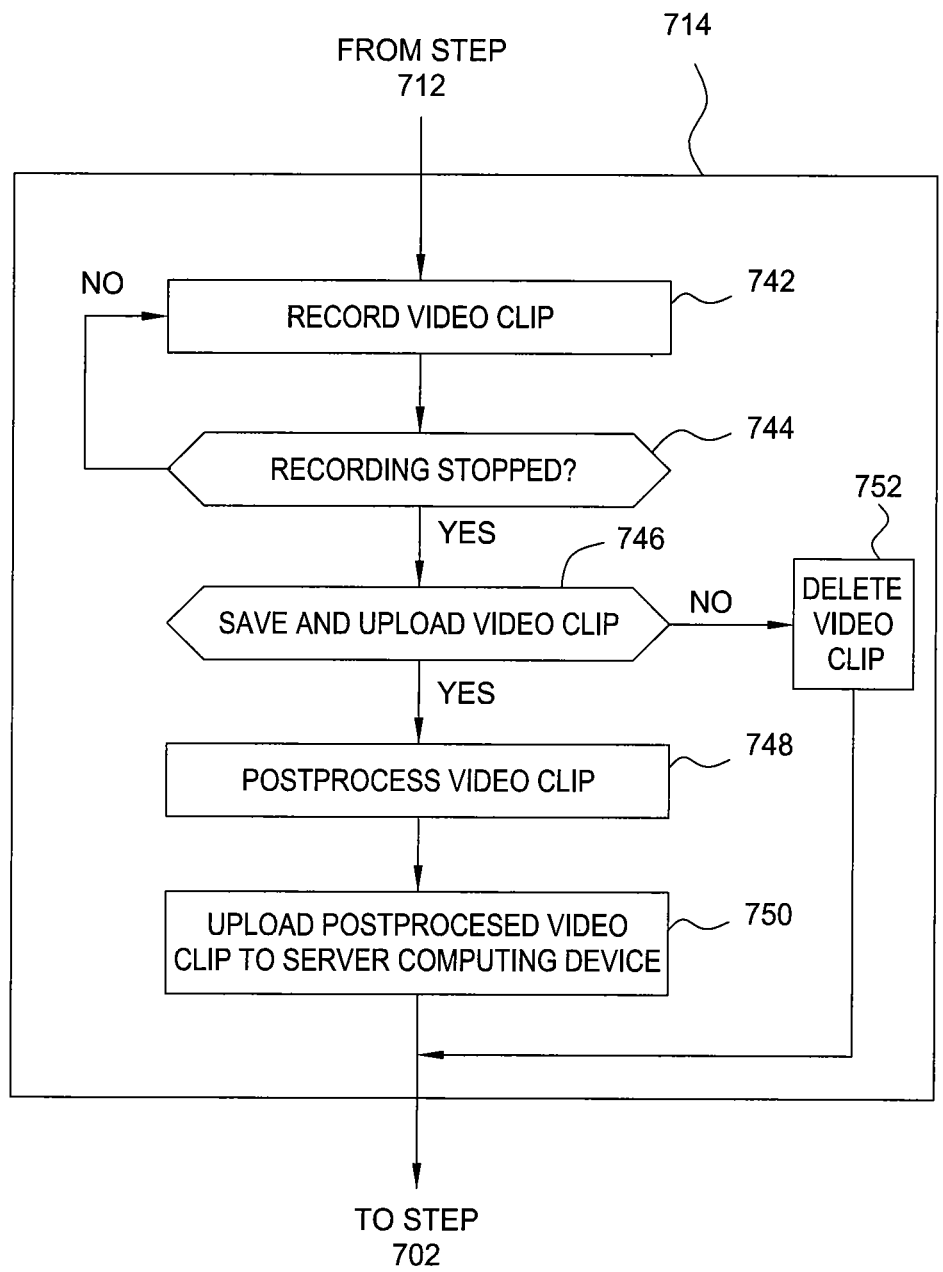
FIG. 7D is a flowchart of method steps for recording a video clip, according to one embodiment of the invention.

FIG. 7D is a flowchart of method steps for recording a video clip, according to one embodiment of the invention. Although the method steps are described in conjunction with the systems of FIGS. 1A and 1B, persons skilled in the art will understand that any system configured to perform the method steps, in any order, is within the scope of the invention.

As shown, FIG. 7D illustrates step 714 of the method 700 described above in conjunction with FIG. 7A. The tool data engine 122 performs step 714 when recording a video clip for storage on the server computing device 104. Step 714 includes steps 742, 744, 746, 748, and 750.

At step 742, the tool data engine 122 begins recording the video clip. The video clip may show the end-user performing various operations using a selected tool. At step 744, the tool data engine 122 determines whether recording of the video clip has stopped. The end-user may stop recording the video clip by, for example, pressing the space bar. If the tool data engine 122 determines that recording has not stopped, then the method 700 returns to step 742 and the tool data engine 122 continues recording the video clip.

At step 744, if the tool data engine 122 determines that recording has stopped, then the method 700 proceeds to step 746. At step 746, the tool data engine 122 determines whether the recorded video clip should be saved and uploaded. For example, the tool data engine 122 may receive input from the end-user specifying whether to save and upload the recorded video clip. If the tool data engine 122 determines that the recorded video clip should be saved and uploaded, then the method 700 proceeds to step 748. At step 748, the tool data engine 122 postprocesses the recorded video clip. This postprocessing may involve receiving user input to be incorporated into the video clip, such as, for example, a written description, a title, an audio narration, or captions. The postprocessing may also involve editing the video clip itself.

At step 750, the tool data engine 122 uploads the postprocessed video clip to the server computing device 104. The method 700 then returns to step 702 and proceeds as described in conjunction with FIG. 7A.

At step 746, if the tool data engine 122 determines that the recorded video clip should not be saved and uploaded, then the method 700 proceeds to step 752. At step 752, the tool data engine 122 deletes the recorded video clip. The method 700 then returns to step 702 and proceeds as described in conjunction with FIG. 7A.

Through the method steps described herein, the tool data engine implements the functionality associated with the tool data GUI 526.

In sum, a tool data engine displays instructional information to an end-user of that pertains to one or more tools associated with a software application. The tool data engine displays the instructional information within a graphical user interface (GUI) having an alpha value that is based on the position of a cursor. Within this GUI, the tool data engine may display a brief description of each tool, a detailed description of each tool, and one or more video clips associated with each tool. The tool data engine also allows end-users to generate new video clips for a given tool and to upload those video clips to a server.

Advantageously, instructional information associated with a tool can be displayed while the end-user performs other tasks involving the cursor. In addition, the instructional information is sufficiently detailed that the end-user may be able to effectively learn how to use the different tools associated with the software application. Finally, the pool of instructional information can be expanded to include new information supplied by other end-users, which may help to avoid a situation where vital instructional information is missing from a help database.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed:

1. A computer-implemented method for providing instructional information to an end-user of a software application, the method comprising:
   receiving, from the end-user, an indication of a tool that is associated with the software application and is configured to allow data associated with the software application to be modified;
   causing a display device to display a tool data graphical user interface (GUI) in response to the indication, wherein the tool data GUI includes a first portion of instructional information pertaining to usage of the tool and one or more GUI elements;
   receiving, from the end-user, a selection of a first GUI element included in the tool data GUI;
   updating the tool data GUI to display a second portion of instructional information comprising a first video clip illustrating a usage of the tool in response to the selection;
   selecting a third portion of instructional information comprising a second video clip illustrating the usage of the tool, wherein selecting the third portion of instructional information is based on a first numeric relevance value that indicates a relevance of the third portion of instructional information relative to the second portion of instructional information;
   selecting a fourth portion of instructional information comprising a third video clip illustrating the usage of the tool, wherein selecting the fourth portion of instructional information is based on a second numeric relevance value that indicates a relevance of the fourth portion of instructional information relative to the second portion of instructional information;
   updating the tool data GUI to display, while displaying the second portion of the instructional information in a first window:
      a first thumbnail associated with the third portion of instructional information in a second window, and
      a second thumbnail associated with the fourth portion of instructional information in the second window;
   initiating playback of the second portion of the instructional information; and
   after completion of playback of the second portion of instructional information, updating the tool data GUI to:
      remove the second portion of instructional information from the first window, and
      display, in the first window, at least one of the third portion of instructional information and the fourth portion of instructional information.

2. The method of claim 1, wherein the first portion of instructional information includes at least one of a textual description of the usage of the tool or one or more images illustrating usage of the tool.

3. The method of claim 1, wherein a tool data engine causes the display device to display the tool data GUI within a software application GUI also displayed by the display device, and wherein the software application GUI includes an icon representing the tool.

4. The method of claim 3, wherein the tool data engine causes the display device to display the tool data GUI when a distance between a screen position of a cursor and a screen position of the icon representing the tool is less than or equal to a threshold value.

5. The method of claim 3, wherein the tool data engine causes the display device to cease displaying the tool data GUI when a distance between a screen position of a cursor and a screen position of the icon representing the tool is greater than or equal to a threshold value.

6. The method of claim 3, wherein the tool data engine determines a transparency value for displaying the tool data GUI based on a distance between a screen position of a cursor and a screen position of the icon representing the tool.

7. The method of claim 1, wherein the software application comprises a computer-aided design application or other graphical user interface.

8. The method of claim 1, wherein the first portion of instructional information and second portion of instructional information are distributed across one or more databases.

9. The method of claim 1, further comprising calculating the first numeric relevance value based on a frequency with which the end-user views the third portion of instructional information immediately following viewing the second portion of instructional information.

10. The method of claim 1, further comprising calculating the first numeric relevance value based on a plurality of ratings received from a plurality of users, wherein the plurality of ratings are related to the second portion of instructional information and the third portion of instructional information.

11. The method of claim 1, further comprising retrieving the first numeric relevance value from a relevance table, wherein the relevance table includes the first numeric relevance value and a second numeric relevance value that indicates a relevance of the second portion of instructional information relative to the third portion of instructional information.

12. One or more non-transitory computer-readable media including instructions that, when executed by one or more processors, cause the the one or more processors to perform the steps of:
  receiving, from an end-user, an indication of a tool that is associated with a software application and is configured to allow data associated with the software application to be modified;
  causing a display device to display a tool data graphical user interface (GUI) in response to the indication, wherein the tool data GUI includes a first portion of instructional information pertaining to usage of the tool and one or more GUI elements;
  receiving from the end-user a selection of a first GUI element included in the tool data GUI;
  updating the tool data GUI to display a second portion of instructional information comprising a first video clip illustrating a usage of the tool in response to the selection;
  selecting a third portion of instructional information comprising a second video clip illustrating the usage of the tool, wherein selecting the third portion of instructional information is based on a first numeric relevance value that indicates a relevance of the third portion of instructional information relative to the second portion of instructional information;
  selecting a fourth portion of instructional information comprising a third video clip illustrating the usage of the tool, wherein selecting the fourth portion of instructional information is based on a second numeric relevance value that indicates a relevance of the fourth portion of instructional information relative to the second portion of instructional information;
  updating the tool data GUI to display, while displaying the second portion of instructional information in a first window:
    a first thumbnail associated with the third portion of instructional information in a second window, and
    a second thumbnail associated with the fourth portion of instructional information in the second window;
  initiating playback of the second portion of instructional information; and
  after completion of playback of the second portion of instructional information, updating the tool data GUI to:
    remove the second portion of instructional information from the first window, and
    display, in the first window, at least one of the third portion of instructional information and the fourth portion of instructional information.

13. The one or more non-transitory computer-readable media of claim 12, wherein the first portion of instructional information includes at least one of a textual description of the usage of the tool or one or more images illustrating usage of the tool.

14. The one or more non-transitory computer-readable media of claim 12, wherein a tool data engine causes the display device to display the tool data GUI within a software application GUI also displayed by the display device, and wherein the software application GUI includes an icon representing the tool.

15. The one or more non-transitory computer-readable media of claim 14, wherein the tool data engine causes the display device to display the tool data GUI when a distance between a screen position of a cursor and a screen position of the icon representing the tool is less than or equal to a threshold value.

16. The one or more non-transitory computer-readable media of claim 14, wherein the tool data engine causes the display device to cease displaying the tool data GUI when a distance between a screen position of a cursor and a screen position of the icon representing the tool is greater than or equal to a threshold value.

17. The one or more non-transitory computer-readable media of claim 14, wherein the tool data engine determines a transparency value for displaying the tool data GUI based on a distance between a screen position of a cursor and a screen position of the icon representing the tool.

18. The one or more non-transitory computer-readable media of claim 12, wherein the software application comprises a computer-aided design application or other graphical user interface.

19. The one or more non-transitory computer-readable media of claim 12, wherein the first portion of instructional information and second portion of instructional information are distributed across one or more databases.

20. A computing device for providing instructional information to an end-user of a software application executing on the computing device, the computing device comprising:
a memory storing the software application; and
a processor coupled to the memory that executes the software application to:
receive, from the end-user, an indication of a tool that is associated with the software application and is configured to allow data associated with the software application to be modified,
cause a display device to display a tool data graphical user interface (GUI) in response to the indication, wherein the tool data GUI includes a first portion of instructional information pertaining to usage of the tool and one or more GUI elements,
receive from the end-user a selection of a first GUI element included in the tool data GUI,
update the tool data GUI to display a second portion of instructional information comprising a first video clip illustrating a usage of the tool in response to the selection;
select a third portion of instructional information comprising a second video clip illustrating the usage of the tool, wherein selecting the third portion of instructional information is based on a first numeric relevance value that indicates a relevance of the third portion of instructional information relative to the second portion of instructional information;
select a fourth portion of instructional information comprising a third video clip illustrating the usage of the tool, wherein selecting the fourth portion of instructional information is based on a second numeric relevance value that indicates a relevance of the fourth portion of instructional information relative to the second portion of instructional information;
update the tool data GUI to display, while displaying the second portion of the instructional information in a first window:
a first thumbnail associated with the third portion of instructional information in a second window, and
a second thumbnail associated with the fourth portion of instructional information in the second window;
initiate playback of the second portion of the instructional information; and
after completion of playback of the second portion of instructional information, update the tool data GUI to:
remove the second portion of instructional information from the first window, and
display, in the first window, at least one of the third portion of instructional information and the fourth portion of instructional information.

* * * * *

UNITED STATES PATENT AND TRADEMARK OFFICE
CERTIFICATE OF CORRECTION

PATENT NO. : 10,387,175 B2  
APPLICATION NO. : 12/849706  
DATED : August 20, 2019  
INVENTOR(S) : Tovi Grossman and George Fitzmaurice Page 1 of 1

It is certified that error appears in the above-identified patent and that said Letters Patent is hereby corrected as shown below:

In the Claims

Column 17, Claim 12, Line 51, please delete "the" after the.

Signed and Sealed this
Twelfth Day of November, 2019

Andrei Iancu
*Director of the United States Patent and Trademark Office*